(12) United States Patent
Lacoste et al.

(10) Patent No.: US 9,243,169 B2
(45) Date of Patent: Jan. 26, 2016

(54) SECURITY LAMINATE

(71) Applicant: SICPA HOLDING SA, Prilly (CH)

(72) Inventors: Russell R. Lacoste, Mount Pleasant, SC (US); Stephen Wass, Annapolis, MD (US); James Bonhivert, Clifton, VA (US); Toni Lee Gazaway, Stafford, VA (US); Sarah Yacoub, Washington, DC (US); Thomas Classick, Fairfax Station, VA (US)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/278,698

(22) Filed: May 15, 2014

(65) Prior Publication Data
US 2014/0339298 A1 Nov. 20, 2014

(30) Foreign Application Priority Data
May 16, 2013 (WO) ................ PCT/US2013/041390

(51) Int. Cl.
*G06F 17/00* (2006.01)
*C09J 7/02* (2006.01)
*G06K 19/06* (2006.01)
(Continued)

(52) U.S. Cl.
CPC ............... *C09J 7/0296* (2013.01); *B32B 33/00* (2013.01); *B42D 25/30* (2014.10); *B42D 25/36* (2014.10); *B42D 25/364* (2014.10); *B42D 25/378* (2014.10); *B42D 25/382* (2014.10); *B42D 25/387* (2014.10); *B42D 25/391* (2014.10); *G06K 19/06028* (2013.01); *G06K 19/06037* (2013.01); *G06K 19/06046* (2013.01); *G09F 3/00* (2013.01); *G09F 3/0292* (2013.01); *G09F 3/0294* (2013.01); *B32B 38/145* (2013.01); *B32B 2307/402* (2013.01); *B32B 2307/422* (2013.01);
(Continued)

(58) Field of Classification Search
CPC ............... B42D 2035/44; B42D 25/00; B42D 2033/30; B42D 2035/24; B42D 25/47; B42D 25/41; G03G 21/043; C09J 2203/338; C09J 2203/0296; G07D 7/124; G09F 3/0292; Y10S 428/916
See application file for complete search history.

(56) References Cited

U.S. PATENT DOCUMENTS 4,344,987 A 8/1982 Ostertag et al.
4,705,300 A 11/1987 Berning et al.
(Continued)

FOREIGN PATENT DOCUMENTS

DE 19525503 1/1997
EP 708154 4/1996
(Continued)

OTHER PUBLICATIONS

International Search Report and Written Opinion in related Application PCT/EP2014/059755 dated Jul. 22, 2014.

*Primary Examiner* — Thien M Le
*Assistant Examiner* — Claude J Brown
(74) *Attorney, Agent, or Firm* — Greenblum & Bernstein, P.L.C.

(57) ABSTRACT

A laminate having a multilayer structure includes a clear film layer, a transfer tape adhesive layer, a microprint text layer, at least one layer with repeating patterns having colorshift properties, and a fluorescent layer with repeating second patterns. The microprint layer, the at least one layer with repeating patterns having colorshift properties, and the fluorescent layer with repeating second patterns are arranged between the clear film layer and the transfer tape adhesive layer.

25 Claims, 9 Drawing Sheets

(51) Int. Cl.

| | | |
|---|---|---|
| *G09F 3/00* | (2006.01) | |
| *B32B 33/00* | (2006.01) | |
| *B42D 25/30* | (2014.01) | |
| *B42D 25/36* | (2014.01) | |
| *B42D 25/364* | (2014.01) | |
| *B42D 25/382* | (2014.01) | |
| *B42D 25/387* | (2014.01) | |
| *B42D 25/391* | (2014.01) | |
| *B42D 25/378* | (2014.01) | |
| *B32B 38/00* | (2006.01) | |

(52) U.S. Cl.
CPC .... *C09J 2203/338* (2013.01); *Y10T 428/24868* (2015.01); *Y10T 428/24876* (2015.01)

(56) References Cited

U.S. PATENT DOCUMENTS

| | | | |
|---|---|---|---|
| 4,705,356 A | 11/1987 | Berning et al. | |
| 4,721,217 A | 1/1988 | Phillips et al. | |
| 4,779,898 A | 10/1988 | Berning et al. | |
| 4,930,866 A | 6/1990 | Berning et al. | |
| 4,978,394 A | 12/1990 | Ostertag et al. | |
| 5,084,351 A | 1/1992 | Philips et al. | |
| 5,401,306 A | 3/1995 | Schmid et al. | |
| 5,607,504 A | 3/1997 | Schmid et al. | |
| 5,624,468 A | 4/1997 | Lake | |
| 6,565,770 B1 | 5/2003 | Mayer et al. | |
| 6,589,445 B2 | 7/2003 | Sugiyama et al. | |
| 2003/0062421 A1* | 4/2003 | Bloomberg et al. | 235/494 |
| 2004/0113420 A1* | 6/2004 | Han et al. | 283/72 |
| 2004/0229022 A1* | 11/2004 | Bourdelais et al. | 428/195.1 |
| 2006/0262367 A1* | 11/2006 | Hattori et al. | 359/15 |
| 2007/0195392 A1* | 8/2007 | Phillips et al. | 359/15 |
| 2007/0206249 A1* | 9/2007 | Phillips et al. | 359/2 |
| 2007/0224341 A1 | 9/2007 | Kuntz et al. | |
| 2007/0298205 A1* | 12/2007 | Allen et al. | 428/41.6 |
| 2008/0014378 A1* | 1/2008 | Hoffmuller et al. | 428/29 |
| 2008/0088895 A1* | 4/2008 | Argoitia et al. | 359/2 |
| 2008/0160226 A1* | 7/2008 | Kaule et al. | 428/29 |
| 2008/0305313 A1* | 12/2008 | Crane et al. | 428/211.1 |
| 2009/0315319 A1* | 12/2009 | Kendrick et al. | 283/93 |
| 2009/0322071 A1* | 12/2009 | Dichtl | 283/70 |
| 2010/0200649 A1 | 8/2010 | Callegari et al. | |
| 2010/0231846 A1* | 9/2010 | Commander et al. | 349/193 |
| 2010/0253061 A1* | 10/2010 | Whiteman | 283/85 |
| 2010/0277805 A1* | 11/2010 | Schilling et al. | 359/619 |
| 2010/0307376 A1 | 12/2010 | Aboutanos et al. | |
| 2011/0012337 A1* | 1/2011 | Heim | 283/94 |
| 2011/0293899 A1 | 12/2011 | Tiller et al. | |
| 2012/0028193 A1 | 2/2012 | Sawanobori et al. | |
| 2012/0146323 A1* | 6/2012 | Schilling et al. | 283/85 |
| 2013/0008965 A1 | 1/2013 | Geuens et al. | |
| 2013/0038942 A1* | 2/2013 | Holmes | 359/619 |
| 2013/0069360 A1* | 3/2013 | Power et al. | 283/85 |
| 2013/0099000 A1* | 4/2013 | Hoshino et al. | 235/457 |
| 2013/0154250 A1* | 6/2013 | Dunn et al. | 283/67 |
| 2013/0189455 A1* | 7/2013 | Sekine et al. | 428/29 |
| 2014/0022493 A1* | 1/2014 | Hoshino et al. | 349/86 |
| 2014/0035720 A1* | 2/2014 | Chapman | 340/5.51 |
| 2014/0376088 A1* | 12/2014 | Kim et al. | 359/463 |

FOREIGN PATENT DOCUMENTS

| | | |
|---|---|---|
| EP | 2374602 | 10/2011 |
| GB | 2347646 | 9/2000 |
| WO | WO93/22397 | 11/1993 |
| WO | WO95/22586 | 8/1995 |
| WO | WO2004/007210 | 1/2004 |
| WO | WO2008033059 | 3/2008 |
| WO | WO2008092522 | 8/2008 |

\* cited by examiner

SECURITY LAMINATE

CROSS REFERENCE TO RELATED APPLICATION

The present application claims priority under 35 U.S.C. §119 and §365 of International Application No. PCT/US13/041390 filed May 16, 2013, the disclosure of which is expressly incorporated by reference herein in its entirety.

FIELD OF THE INVENTION

Embodiments of the present invention relates to a method and system for a security laminate.

BACKGROUND OF THE INVENTION

Counterfeit consumer goods, commonly called knock-offs, are counterfeit or imitation products offered for sale. The spread of counterfeit goods has become global in recent years and the range of goods subject to counterfeiting has increased significantly.

Product counterfeiting occurs on artworks, CDs, DVDs, computer software recorded on CDs or diskettes, perfumes, designer clothes, handbags, briefcases, automobile and airplane parts, securities (e.g., stock certificates), identification cards (driver's licenses, passports, visas, green cards), credit cards, smart cards, wine bottles, and pharmaceuticals, amongst other items. According to the World Health Organization, more than 7% of the world's pharmaceuticals are counterfeit. This percentage is higher in some countries, such as Colombia, where up to 40% of all medications are believed to be fake. The recent explosion of Internet drug sales from other countries and increasingly sophisticated counterfeiting techniques have substantially increased the amount of fraudulent drugs entering the United States.

If goods are not genuine, then product counterfeiting has occurred. If goods have been diverted from their intended channel of commerce by, for example, entering into a country where the goods are prohibited by contract or by law, then the goods have been subject to product diversion.

Additionally, almost as long as there have been documents of inherent value there have been attempts to counterfeit those documents. Security measures added to documents to deter counterfeiting have met with varying levels of success. United States currency, for example, have incorporated various security measures over the years. These include, for example, special ink and paper formulations, engraved patterns that interfere with photographic reproduction, "hidden" details within the engraved image, watermarks and strips of imprinted film embedded within the currency paper.

Security laminates are traditionally used to protect documents or packages to ensure that the underlying items are not altered. Security laminates are particularly useful on identification cards such as driver's licenses and passports, and on other important documents such as certificates of title, identification cards, entry passes, ownership certificates, financial instruments, and the like. Security laminates are also useful as protective labels on medications, video cassettes, and compact discs. Four features are particularly important when producing and using security laminates. First, once applied to an article it is important that the laminate is difficult to remove to ensure that the underlying item is not altered or subjected to tampering. Second, an effective laminate is difficult if not impossible to duplicate by counterfeiters. Third, if tampering occurs it is important to quickly and accurately recognize an altered or counterfeit laminate. Fourth, it is important that manufacturing and application costs of the laminates are not prohibitively expensive.

Each time a new security measure is implemented, counterfeiters are usually not far behind in their ability to counter those measure. For example, counterfeiters may employ skilled technicians who are able to closely copy special inks and paper. Counterfeiters may also use sophisticated photographic reproduction equipment and techniques to reproduce the intricate engravings, look of the paper and colors of the currency with great accuracy. Security features for valuable documents that are more sophisticated than those currently used are needed to further deter counterfeiters.

Accordingly, a need exists for a security laminate with improved security features.

SUMMARY OF EMBODIMENTS OF THE INVENTION

An aim of the invention is to provide a security laminate with improved security features.

One embodiment of the invention provides a laminate having a multilayer structure, the multilayer structure comprises a clear film layer, a transfer tape adhesive layer; a microprint layer; at least one layer with repeating patterns having colorshift properties, and a fluorescent layer with repeating second patterns. The microprint layer, the at least one layer with repeating patterns having colorshift properties, and the fluorescent layer with repeating second patterns are arranged between the clear film layer and the transfer tape adhesive layer.

In further embodiments of the invention, the laminate further comprises a layer with one of a pearlescent pigment and a black layer made with one of IRA and IRT black ink.

In additional embodiments of the invention, the laminate further comprises on the clear film layer at least one of an alphanumeric code, a 1D barcode and a 2D barcode.

In yet further embodiments of the invention, the at least one layer with repeating pattern having colorshift properties comprises at least one of interference pigments and LCP flakes In additional embodiments, at least one repeating pattern having colorshift properties is in the form of at least one of a logo, a drawing, one or more circles, one or more polygons, ellipses, symbols, check marks, crescents, stars, and other designs elements and shapes, comprising one or more lines.

In further embodiments of the invention, a width of the one or more lines is between approximately 0.3 mm and 0.5 mm.

In additional embodiments of the invention, a microprint height is between approximately 0.5 mm and approximately 0.9 mm.

In yet further embodiments of the invention, a width of the one or more lines is between approximately 0.1 mm and 1.0 mm, a microprint height is between approximately 0.1 mm and approximately 1.5 mm, and the width of lines is a multiple of the height of the microprint.

In additional embodiments, a width of the one or more lines is between approximately 0.3 mm and 0.5 mm, a microprint height is between approximately 0.5 mm and approximately 0.9 mm, and the width of lines is a multiple of the height of the microprint.

In further embodiments of the invention, the width of lines is a multiple of the height of the microprint and the multiple is between 0.5 to 10.

In additional embodiments of the invention, the laminate comprises at least two layers with repeating patterns having colorshift properties, and each layer of the at least two layers with repeating patterns having colorshift properties comprises a different material providing respective colorshift properties.

In further embodiments of the invention, a height of the microprint text is a multiple of a λ, max (maximum reflection band) of the pigments and/or flakes in the at least one layer with repeating patterns having colorshift properties.

In yet further embodiments of the invention, a λ max (maximum reflection band) of the pigments and/or flakes in the at least one layer with repeating patterns having colorshift properties is a predetermined fraction of a height of the microprint text.

In additional embodiments, the alphanumeric characters and/or a 1D or 2D barcode contain information based on at least one of a nature, a structure and a composition of each layer between the clear film layer and the transfer tape adhesive layer.

In further embodiments of the invention, the at least one layer with repeating pattern having colorshift properties comprises both interference pigments and LCP flakes.

In additional embodiments of the invention, a respective pattern of the repeating pattern comprises one of interference pigments and LCP flakes.

In yet further embodiments of the invention, a plurality of individual patterns form a detectable code.

In additional embodiments, the plurality of individual patterns comprise a sequence of respectively adjacent patterns.

In further embodiments of the invention, the detectable code utilizes a first ink and a second ink to represent respective values of a binary system.

In additional embodiments of the invention, the repeating patterns having colorshift properties comprise detectable differences between individual patterns.

In yet further embodiments of the invention, the detectable differences between individual patterns comprise at least one of: differences in at least one size of respective elements of the individual patterns, and differences in at least one spacing of respective elements of the individual patterns.

In additional embodiments, the alphanumeric characters and/or the 1D or 2D barcode contain information based on at least one of a nature, a structure and a composition at least one layer between the clear film layer and the transfer tape adhesive layer.

Another embodiment of the invention is directed to an item bearing the laminate.

A further embodiment of the invention is directed to a method of using the laminate for at least one of authentication and track and trace of an item bearing the laminate or associated with the laminate.

Additional embodiments of the present invention are directed to a method of forming a laminate, comprising a clear film layer, a transfer tape adhesive layer, a microprint text layer, at least one layer with repeating patterns having colorshift properties, and a fluorescent layer with repeating patterns. The method comprises arranging the microprint layer, the at least one layer with repeating patterns having colorshift properties, and the fluorescent layer with repeating patterns between the clear film layer and the transfer tape adhesive layer.

In some embodiments, the arranging comprises printing the fluorescent layer with repeating patterns on the clear film layer, printing the microprint layer on the fluorescent layer, printing the at least one layer with repeating patterns having colorshift properties on the microprint layer, and arranging the transfer tape adhesive layer above the at least one layer with repeating patterns having colorshift properties.

BRIEF DESCRIPTION OF THE FIGURES

For a more complete understanding of the invention, as well as other objects and further features thereof, reference may be had to the following detailed description of the invention in conjunction with the following exemplary and non-limiting drawings wherein.

Figure 1:
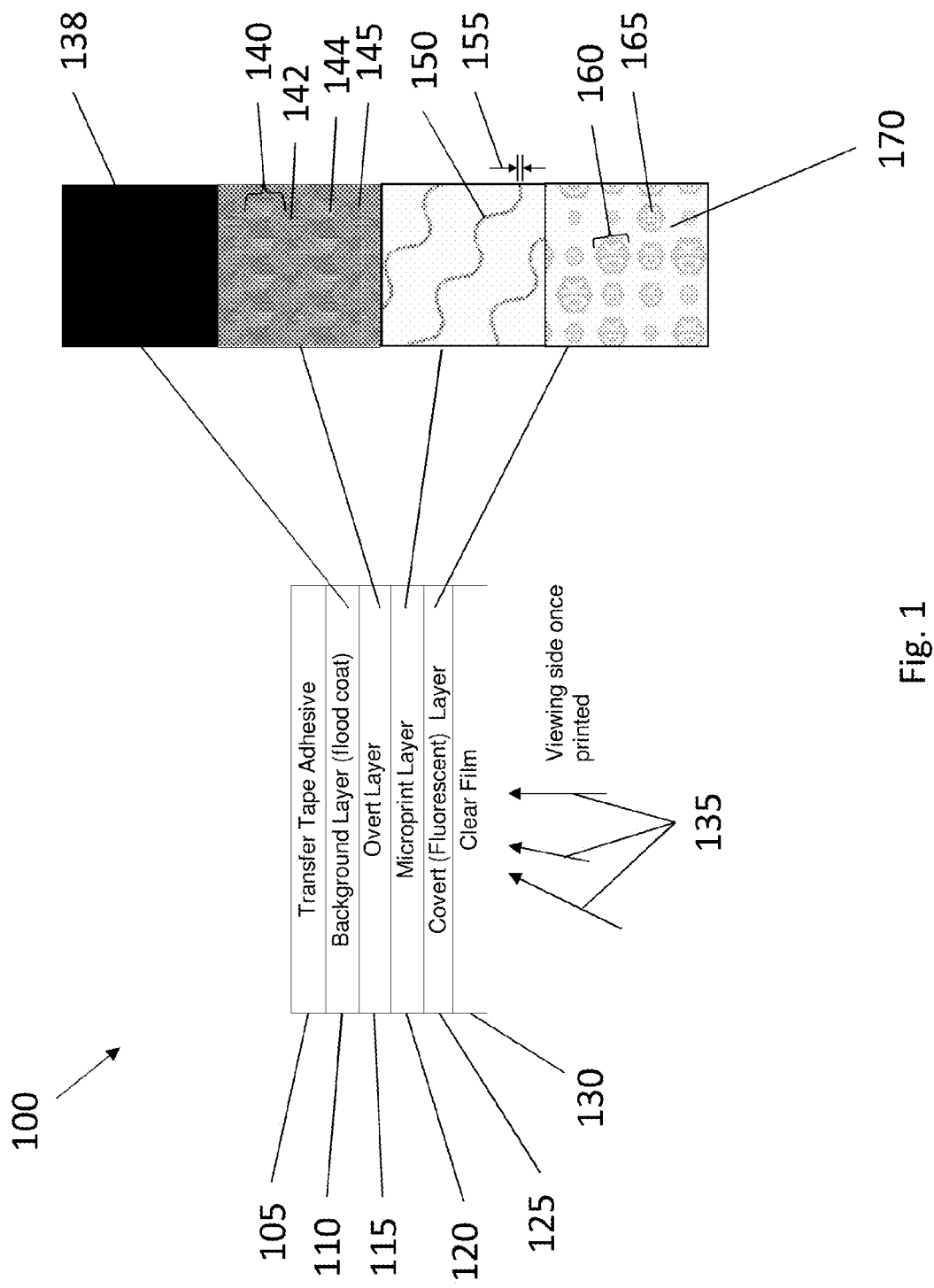
FIGS. 1-5 illustrate exemplary and non-limiting embodiments of a security laminate system in accordance with aspects of embodiments of the invention.

Reference numbers refer to the same or equivalent parts of the present invention throughout the various figures of the drawings.

DETAILED DESCRIPTION OF EMBODIMENTS OF THE INVENTION

In the following description, the various embodiments of the present invention will be described with respect to the enclosed drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

As used herein, the singular forms "a," "an," and "the" include the plural reference unless the context clearly dictates otherwise.

Except where otherwise indicated, all numbers expressing physical quantities, such as quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

Embodiments of the present invention are directed to security laminate (e.g., a label) for authenticating the origin and intended market of a good. Since the persons who counterfeit or divert goods are also inclined to counterfeit such authenticating labels, label structures incorporating covert, authenticating data have been developed. An example of such a label includes both visible data, such as a printed trademark, a manufacturing serial number, or human readable product information, and invisible information which can authenticate the label as one which originated with or under the authority of the manufacturer. Such labels use an invisible marker material which is incorporated in the label. In embodiments, data stored in the marker becomes readable when the label is exposed to light of a particular wavelength.

In embodiments, security laminates are constructed of various materials. In order to overcome the problem of counterfeit documents, embodiments of the present invention make it exceedingly difficult for counterfeiters to duplicate the security laminate used on a particular document. Some embodiments may require special viewing devices to discern whether or not the laminate was subjected to tampering.

A number of security features have been developed to authenticate the document of value, thus preventing forgers from producing a document, which resembles the authentic document during casual observation, but lacks the overt or covert security features known to be present in the authentic document. Overt security features may include holograms and other diffractive optically variable images, embossed images, and color-shifting films, while covert security features may include images only visible under certain conditions such as inspection under light of a certain wavelength (e.g., infrared), polarized light, or retroreflected light.

In embodiments of the present invention, a security laminate system provides a multilayer security laminate. In some embodiments, the security laminate may be designed for brand protection. In further embodiments, the security laminate may be used for label applications and/or and as an overlay for government/ID applications. As described in greater detail below, in accordance with embodiments of the present invention, a process for creating the security laminate includes a reverse-printing film material with a "wallpaper" design. The visible security features are applied as ink layers, each with a distinct image that when combined, creates a seamless "wallpaper" pattern (e.g., repeating geometric patterns), which overlap other layers integrating multiple features to create a secure, yet aesthetic layout.

In embodiments of the invention, the film security laminate may be cut to various sizes while retaining presence of all security features. Additionally, in embodiments of the invention, the film security laminate and may be overprinted. In embodiments of the invention, the security features include one or more of the following: (1) an overt security feature; (2) a semi-covert security feature; (2) a microprint feature; and (4) a covert feature.

Overt Security Feature

In accordance with aspects of the invention, an overt security feature may comprise a layer of security ink having an interference pigment. This overt layer provides for a distinct, unambiguous color-shift when viewed at any angle that is visible without use of a device. In certain embodiments, the print density of the interference pigment ink may be sufficiently transparent to provide visibility to text and images under the overlay. In other embodiments, the print density of the interference pigment ink may be denser for a security label application. Thus, in embodiments, the layer of ink having an interference pigment may be semi-transparent or opaque.

Semi-Covert Security Feature

In accordance with aspects of the invention, a semi-covert security feature may comprise an optically active security ink that incorporates both an overt color shift and semi-covert properties visible through dedicated light polarization features. In embodiments, the laminate includes a transparent overt color-shifting feature with semi-covert properties, wherein polarization effects are detectable using simple authentication devices.

Microprint Feature

In accordance with aspects of the invention, a microprint feature may comprise a microprint layer, which may be applied as both a design (e.g., aesthetic) and security feature. Microprint may be visible to some extent by the unaided eye, but may be small enough to require some magnification. In embodiments of the invention, the microprint feature comprises alphanumerical characters (e.g., a repeating pattern of alphanumerical characters). In embodiments of the invention, the layer of microprint (or microprint layer) may comprise a red UV flexo ink.

Covert Feature

In accordance with aspects of the invention, a covert security feature may comprise an invisible fluorescent feature (i.e., a layer of fluorescent ink) provides covert security that is authenticatable with reading devices.

Exemplary Embodiments

FIG. 1 illustrates an exemplary and non-limiting embodiment of a security laminate system 100. As shown in FIG. 1, in embodiments, the security laminate system 100 includes a clear film substrate 130. In embodiments, a layer of invisible fluorescent security ink (or fluorescent layer) 125, e.g., a covert feature, is printed on the clear film substrate 130. In order to illustrate aspects of embodiments of the invention, in the figures, the invisible fluorescent layer 125 is shown as viewable to the naked human eye. However, as should be understood, invisible fluorescent layer 125 is not visible to the naked human eye without a reading device.

In embodiments, the layer of fluorescent security ink (or fluorescent layer) 125 is printed in a repeating pattern 170 (e.g., a repeating second pattern) comprising individual pattern elements 160. As shown in FIG. 1, the individual pattern elements 160 may be similarly-sized and/or differently-sized. Additionally, one or more of the individual pattern elements 160 may include one or more alphanumerical characters 165 (e.g., "OK").

With the exemplary embodiment of FIG. 1, a layer of microprint (or microprint layer) 120 having one or more microprint features 150 is printed above the layer of fluorescent security ink (or fluorescent layer) 125. As shown in FIG. 1, in embodiments of the invention, the layer of microprint 120 is printed in a repeating pattern. That is, the microprint feature 150 is printed in a repeating pattern (e.g., offset repeating wavy lines). In embodiments of the invention, the microprint feature 150 comprises alphanumerical characters (e.g., a repeating pattern of alphanumerical characters). The microprint feature 150 comprises a height 155. In embodiments of the invention, the layer of microprint (or microprint layer) 120 may comprise a red UV flexo ink.

With the exemplary embodiment of FIG. 1, an overt security feature comprises a layer of security ink (or overt security layer) 115 having interference pigments. In the security laminate 100, the overt security layer 115 is printed above the layer of microprint 120. In embodiments of the present invention, the overt security layer 115 (e.g., the layer of security ink having interference pigments) is also printed in a repeating pattern 145 including individual pattern elements 140. The individual pattern elements 140 comprise areas having ink (e.g., ink areas or lines) 142 and areas not having ink (e.g., blank areas or spaces) 144.

As shown in FIG. 1, in accordance with aspects of embodiments of the invention, the repeating pattern 145 of the overt security layer 115 may be aligned with the repeating pattern 170 of the fluorescent layer 125. Moreover, as can be observed from FIG. 1, the individual pattern elements 160 (of the fluorescent layer 125) are differently-sized, such that they may overlap with respective individual pattern elements 140 (of the overt security layer 115) to a substantially complete extent or to different degrees of partial extent. For example, as can be observed from FIG. 1, in embodiments, from a viewing direction 135 of the security laminate, a smaller-sized individual pattern element 160 may overlap a center area a respective individual pattern element 140, a mid-sized individual pattern element 160 may overlap a larger center area portion a respective individual pattern element 140, and a large-sized individual pattern element 160 may overlap an entire respective individual pattern element 140.

Additionally, as shown in FIG. 1, in embodiments, a background layer 110 is printed above the layer of microprint security ink having interference pigments 115. While the exemplary embodiment of FIG. 1 includes the background layer 110 embodied as a flood coat, with other embodiments (see FIG. 2), the background layer 110 may be a registered coat (i.e., registered, or substantially-aligned, with the pattern of the security ink having interference pigments). Moreover, while the exemplary embodiment of FIG. 1 includes a background layer 110 comprising a black-colored ink 138, in other embodiments (see FIG. 3) the background layer may be a different color, e.g., a gold-colored ink. In accordance with aspects of embodiments of the invention, the black-colored ink 138 may provide a good contrast for the inks of one or more of the other layers.

As shown in FIG. 1, in accordance with aspects of embodiments of the invention, a transfer tape adhesive 105 is applied above the background layer 110, which in operation, serves to attach the security laminate 100 to an item (not shown). In operation, once the layers (e.g., 105, 110, 115, 120 and/or 125) of the security laminate 100 are formed on the clear film substrate 130, the security laminate 100 is flipped over for attachment to an item. As such, in operation, the security laminate 100 is viewed in one or more viewing directions 135 through the clear film substrate 130, as shown in FIG. 1.

Figure 2:
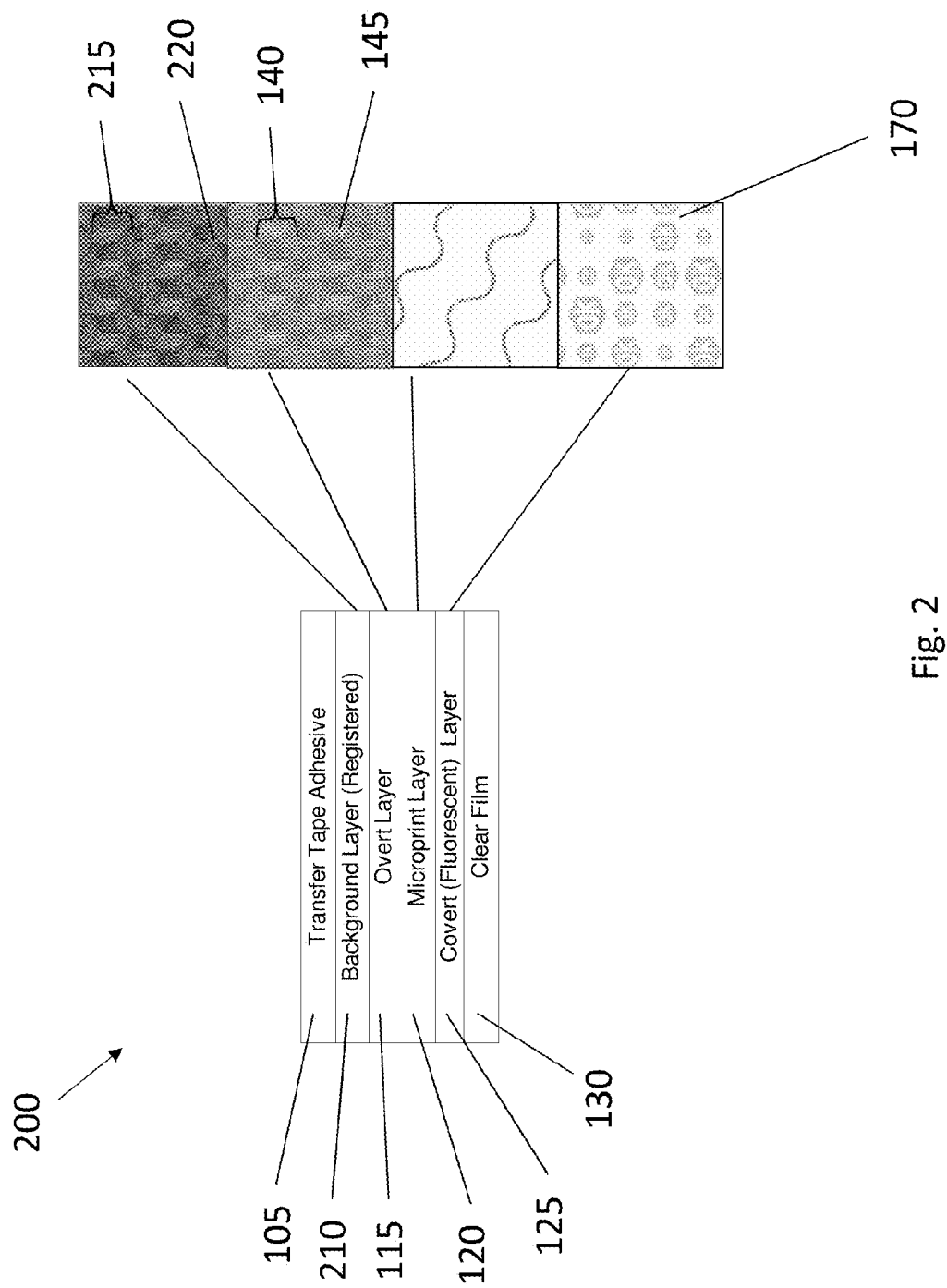

FIG. 2 illustrates another exemplary and non-limiting embodiment of a security laminate system 200 in accordance with aspects of embodiments of the invention. With security laminate system 200, the background layer 210 is a registered coat (in contrast to the flood coat of FIG. 1), having a repeating pattern 220 of individual pattern elements 215 registered with the repeating pattern 145 of the overt security layer 115 (or security ink having interference pigments). Additionally, in embodiments the repeating pattern 220 of the background layer 210 and the repeating pattern 145 of the overt security layer 115 may both align with repeating pattern 170 of the fluorescent layer 125.

Figure 3:
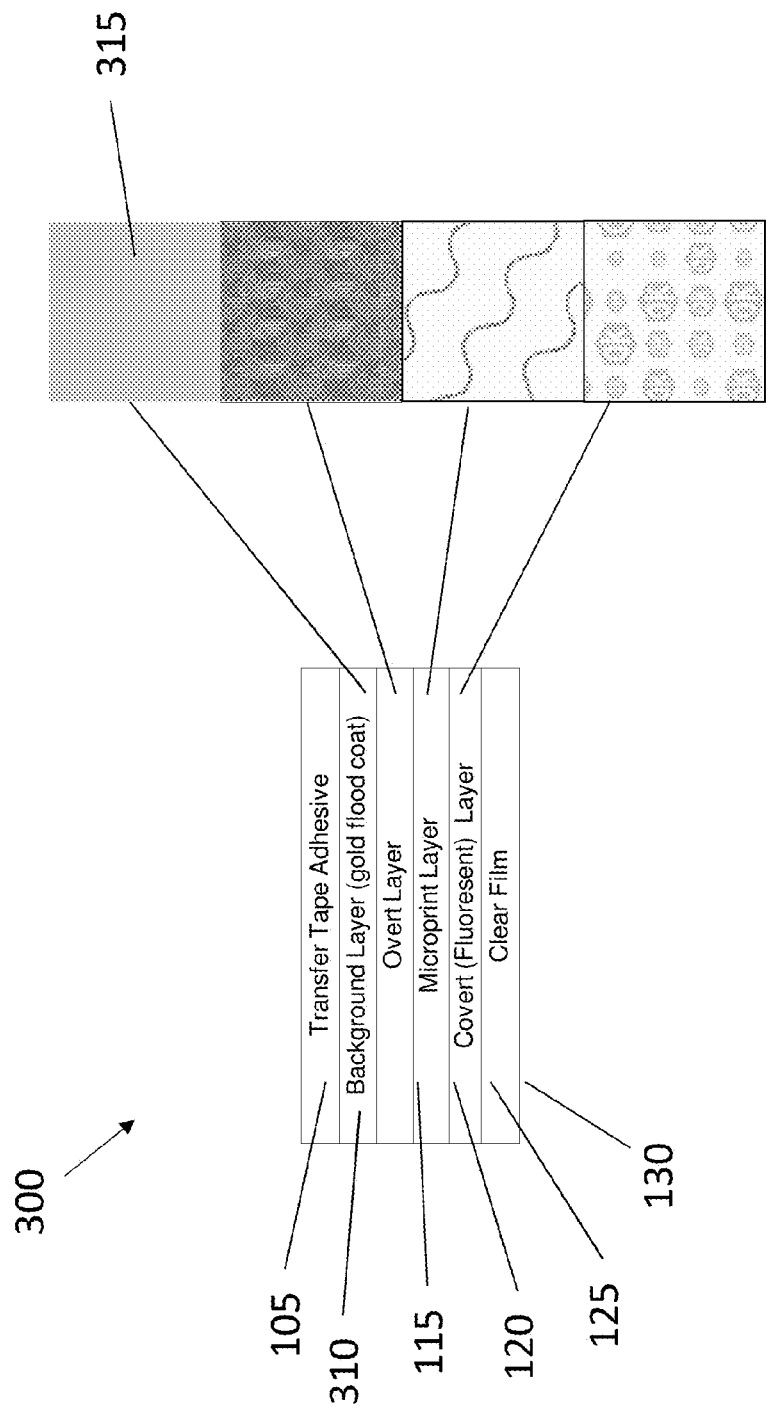

FIG. 3 illustrates another exemplary and non-limiting embodiment of a security laminate system 300. With this embodiment of the security laminate system 300, the background layer 310 is a colored (non-black) ink (e.g., gold-colored ink 315). In accordance with aspects of embodiments of the invention, the gold-colored ink 315 provides a good contrast to the inks of one or more of the other layers.

Figure 4:
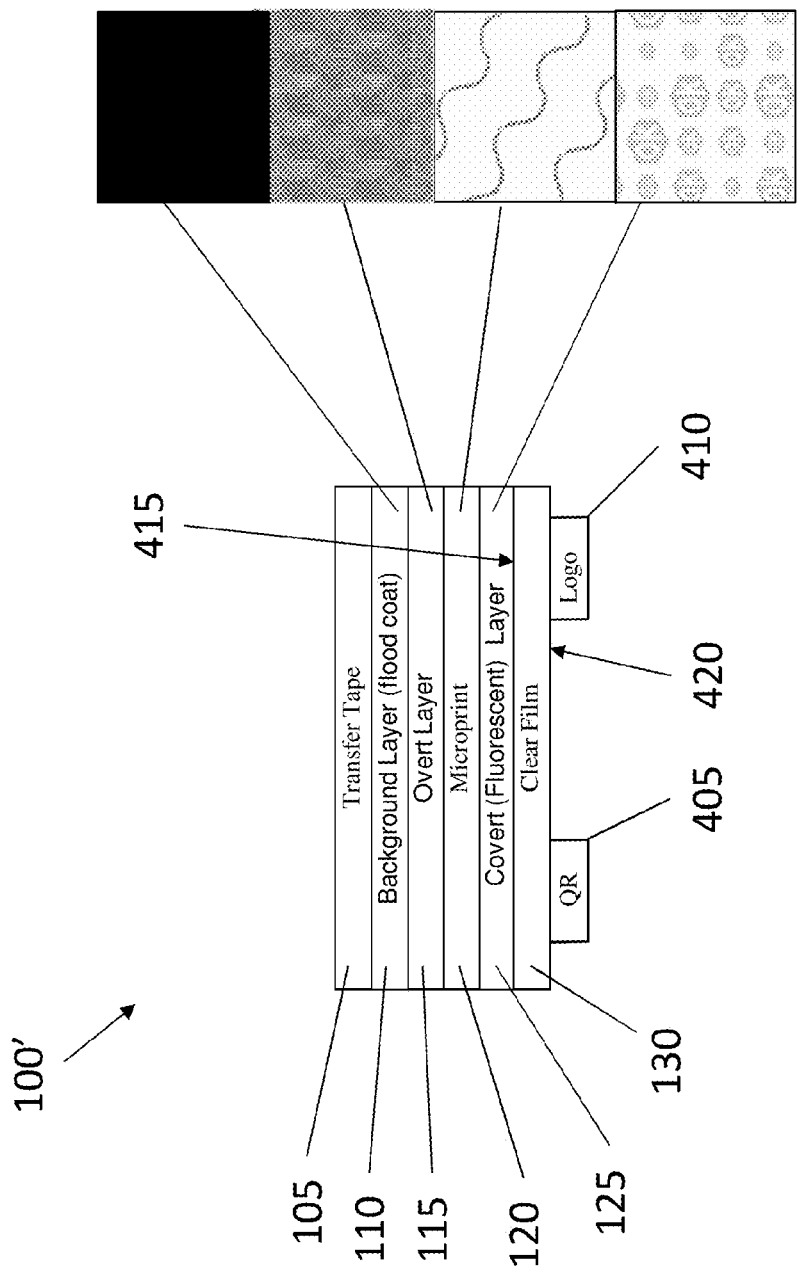

FIG. 4 illustrates another exemplary and non-limiting embodiment of a security laminate system 100'. In accordance with embodiments of the invention, the security laminate 100' also includes a bar code or alphanumeric characters, and a semi-covert security feature. As shown in FIG. 4, with the security laminate 100', once the above-discussed layers are printed on a first side 415 of the clear film substrate 130, one or more of two additional security features may be printed upon the second side 420 of the clear film substrate 130. Specifically, as shown in FIG. 4, the security laminate system 100' includes a bar code security feature 405 (e.g., a QR code, 1D barcode, 2D barcode, and/or alphanumeric characters). In embodiments, the alphanumeric characters and/or the 1D or 2D barcode contain information based on at least one of a nature, a structure and a composition at least one layer between the clear film layer and the transfer tape adhesive layer. In further embodiments the alphanumeric characters and/or a 1D or 2D barcode contain information based on at least one of a nature, a structure and a composition of each layer between the clear film layer and the transfer tape adhesive layer. In such exemplary manners, in embodiments, the security laminate may be self-authenticating.

Additionally, the security laminate system 100' includes a semi-covert feature 410 (e.g., in the form of a logo) printed on the second side of the clear film, which is a semi-covert security feature. For example, the logo 410 is printed with an optically active security ink that incorporates both an overt color shift and a semi-covert property visible through dedicated light polarization features. The polarization effects are detectable using authentication devices.

Figure 5:
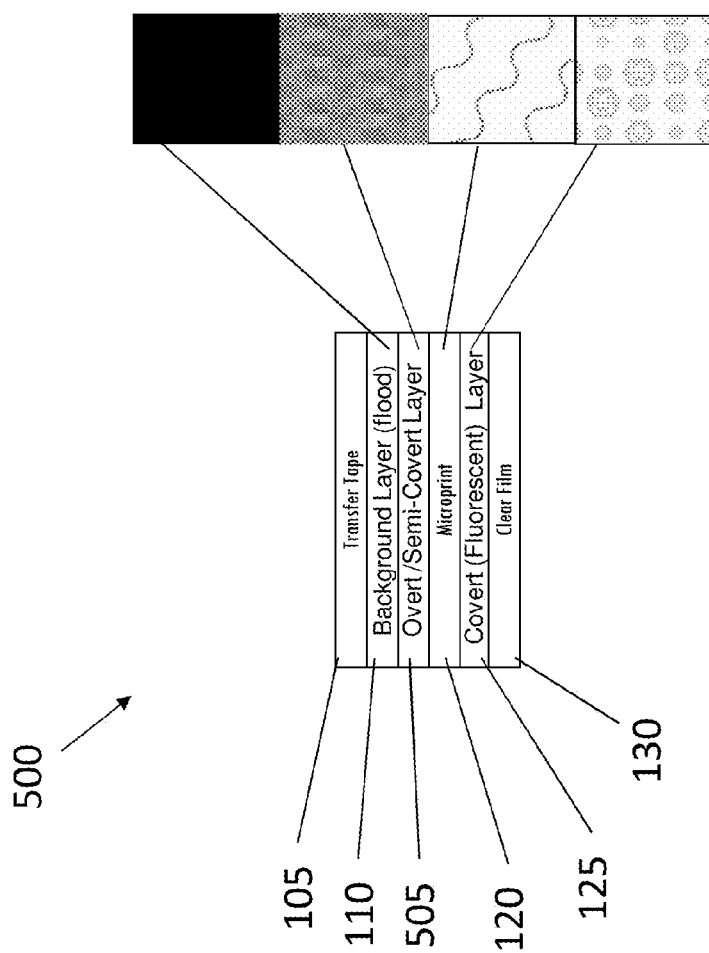

FIG. 5 illustrates another exemplary and non-limiting embodiment of a security laminate system 500. With the embodiment of FIG. 5, the layer 505 may include one or more of: (1) a security ink having an interference pigment; and (2) an optically active security ink incorporating both an overt color shift and semi-covert properties visible through dedicated light polarization features. In embodiments, the two inks of layer 505 may be overlapping, partially overlapping, and/or juxtaposed with respect to one another. In some embodiments, the layer 505 having least one layer with repeating pattern having colorshift properties may include both interference pigments and LCP flakes. In further embodiments, the layer 505 may comprise at least two layers with repeating patterns having colorshift properties, and wherein each layer of the at least two layers with repeating patterns having colorshift properties comprises a different material providing respective colorshift properties.

The above-described inks are printed sub-surface on the clear film in layers of repeating "wallpaper" patterns with, in embodiments, the following layers: a) a luminescent ink; b) a microprint of visible and/or luminescent color; c) a color-shifting ink and/or a polarizing ink; d) a flood coated IRA or an IRT black ink. In embodiments, layers a, b, and/or c may contain a machine readable taggant. In certain embodiments, security features of each layer are not dependent upon one another for functionality, but when combined and viewed from the opposite side (through the film layer 130) create a visually dramatic security material. The printed material is laminated with a transfer tape adhesive 105 on the sub-surface side, thus creating a distinctive fully layered security substrate in which the consistent repetition of geometric pattern enhances the optical properties enabling inclusion of all security features in finished die cut labels of a multitude of shapes and dimensions for use in security applications. Component layers also allow for tamper evidence via fracture and destruction of layers upon disruption.

Figure 6:
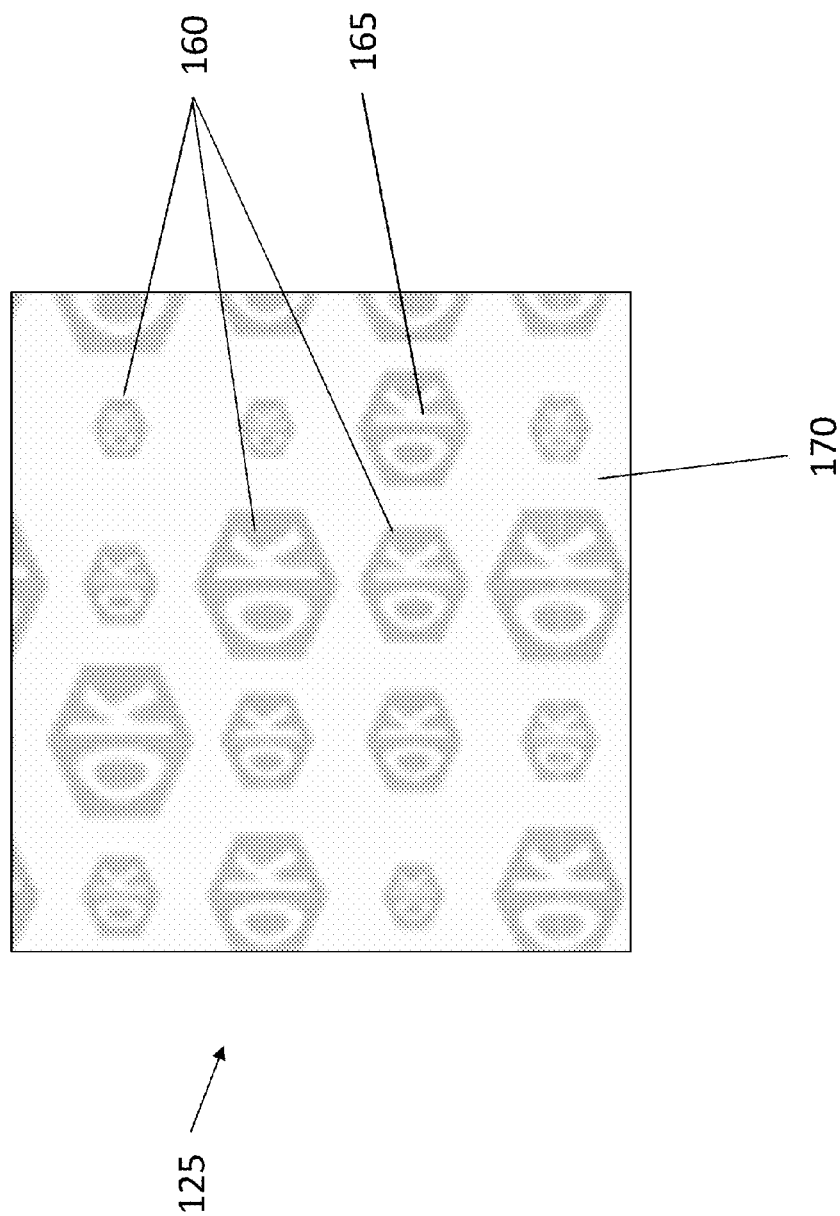
FIG. 6 illustrates a closer view of a covert security layer in accordance with embodiments of the invention.

FIG. 6 illustrates a closer view of an exemplary fluorescent layer 125 in accordance with embodiments of the invention. As shown in FIG. 6, in embodiments, the fluorescent (or covert) layer 125 is printed in a pattern 170 (e.g., a repeating second pattern) comprising individual pattern elements 160. As shown in FIG. 1, the individual pattern elements 160 may be similarly-sized and/or differently-sized. Additionally, one or more of the individual pattern elements 160 may include one or more alphanumerical characters 165 (e.g., "OK").

Figure 7:
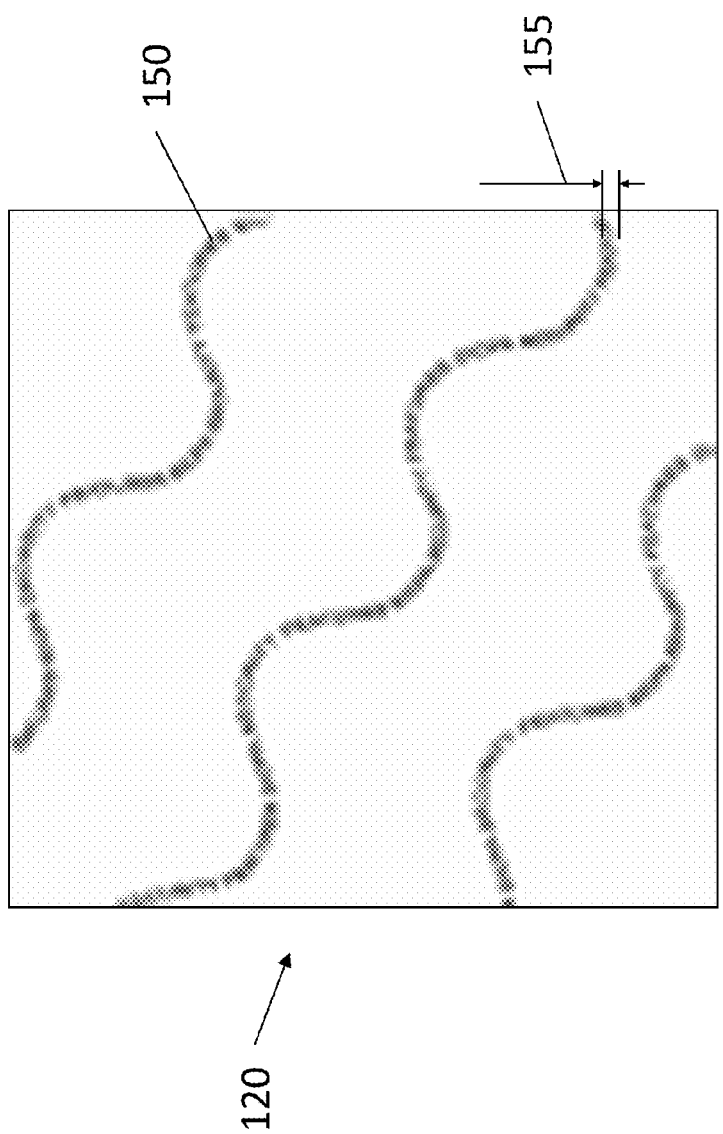
FIG. 7 illustrates a closer view of a microprint layer in accordance with embodiments of the invention.

FIG. 7 illustrates a closer view of an exemplary microprint layer 120 in accordance with embodiments of the invention. As shown in FIG. 7, in embodiments of the invention, the layer of microprint layer 120 may be printed in a repeating pattern. That is, the microprint feature 150 is printed in a repeating pattern (e.g., offset repeating wavy lines). In embodiments of the invention, the microprint feature 150 comprises text or alphanumerical characters (e.g., a repeating pattern of alphanumerical characters). The microprint feature 150 comprises a height 155. In some embodiments, a microprint height 155 is between approximately 0.1 mm and approximately 1.5 mm. In further embodiments, a microprint height 155 is between approximately 0.5 mm and 0.9 mm.

Figure 8:
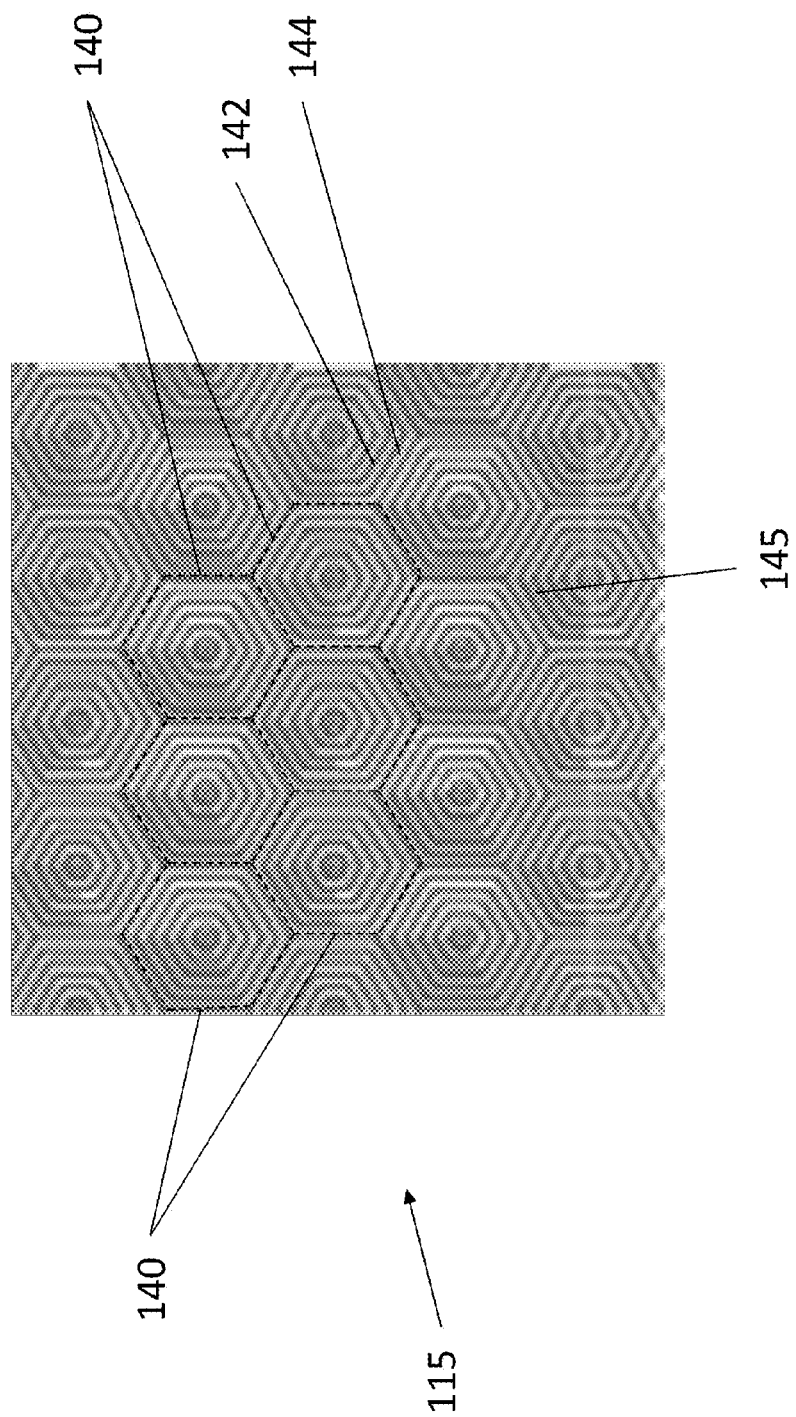
FIG. 8 illustrates a closer view of an overt security layer in accordance with embodiments of the invention.

FIG. 8 illustrates a closer view of an overt security layer 115 in accordance with embodiments of the invention. In embodiments, the overt security layer 115 having at least one repeating pattern with colorshift properties is in the form of at least one of a logo, a drawing, one or more circles, one or more polygons, ellipses, symbols, check marks, crescents, stars, and other designs elements and shapes, comprising one or more lines. As shown in FIG. 8, in embodiments of the present invention, the overt security layer 115 (e.g., the layer of security ink having interference pigments) may be printed in a repeating pattern 145 including individual pattern elements 140 (exemplarily demarcated with dashed lines). As shown in the exemplary and non-limiting embodiment of FIG. 8, the repeating pattern 145 includes concentric polygons comprising lines. The individual pattern elements 140 comprise areas having ink (e.g., ink areas or lines) 142 and areas not having ink (e.g., blank areas or lines) 144. In some embodiments, a width of the one or more lines is between approximately 0.1 mm and 1.0 mm. In further embodiments, a width of the one or more lines is between approximately 0.3 mm and 0.5 mm.

In accordance with aspects of embodiments of the invention, the width of lines of the overt security layer 115 may be a multiple of the height 155 of the microprint text 150. In some embodiments, the multiple may be between approximately 0.5 to 10. In such a manner, properties of the different layers can be linked to provide a more secure and robust security laminate.

In embodiments of the present invention, the individual pattern elements 140 (exemplarily demarcated with dashed lines) of the repeating pattern 145 may form a detectable code. In some embodiments, the detectable code comprises a plurality of individual pattern elements 140. In embodiments, a plurality of individual patterns comprises a sequence of respectively adjacent patterns 140. In embodiments, the detectable code utilizes a first ink and a second ink to represent respective values of a binary system. For example, in embodiments, individual pattern elements 140 of the repeating pattern 145 may comprise either interference pigments or LCP flakes. That is, while shown as a single layer of ink, in some embodiments, the repeating pattern 145 may comprise a plurality of layers, with some of the respective pattern elements 140 printed with a first ink, and other of the respective pattern elements 140 printed with a second ink (or, in embodiments, both the first ink and the second ink). In accordance with aspects of embodiments of the invention, the detectable code may enhance the security and/or robustness of the security laminate, and may provide a self-authentication feature for the security laminate.

In embodiments, the repeating patterns having colorshift properties may comprise detectable differences (e.g., varying line widths and/or spacing) between individual pattern elements 140 (or lines thereof). For example, in embodiments, the detectable differences between individual pattern elements 140 may comprise at least one of: differences in at least one size of respective features (e.g., lines 142, polygonal shape, etc.) of the individual pattern elements 140, and differences in at least one spacing 144 of individual pattern elements and/or respective features of the individual pattern elements 140. In accordance with aspects of embodiments of the invention, the detectable differences may enhance the security and/or robustness of the security laminate.

In yet further embodiments of the invention, a height 155 of the microprint feature 150 may be a multiple of a λ max (maximum reflection band) of the pigments and/or flakes in the at least one layer with repeating patterns having colorshift properties (e.g., overt layer 115 or 505). In such a manner, in embodiments, properties of the different layers may be linked to provide a more secure and robust security laminate.

In yet further embodiments of the invention, a λ max (maximum reflection band) of the pigments and/or flakes in the at least one layer with repeating patterns having colorshift properties (e.g., overt layer 115 or 505) may be a predetermined fraction (e.g., 1/100, 0.00375, 1.1) of a height 155 of the microprint feature 150. In such a manner, in embodiments, properties of the different layers may be linked to provide a more secure and robust security laminate.

Covert Yes/No Validation Feature

Embodiments of the present invention are directed to a covert yes/no validation feature. In embodiments, a machine-readable solution offers optimal protection by detecting the unique characteristics of covert markers based on, e.g., 3D measurements, ensuring highly discriminating verification.

Forensic Feature

In accordance with additional embodiments of the invention, when using color-shifting ink features, an additional micro-taggant may be applied that allows for forensic authentication and unique identification of the ink. Such covert unique identifiers may require use of an authenticator device, as authentication will seek to confirm presence of markers (e.g., that can carry a graphic or feature, e.g., in a microscale).

Overview of Security Ink Layers

In accordance with embodiments of the invention, the one or more layers of the security laminate may include an overt security feature comprising a layer having a first ink composition having interference pigments (e.g., having flakes exhibiting full reflection of light received at a predetermined wavelength flakes) and/or semi-covert security feature comprising an optically active security ink incorporating both an overt color shift and semi-covert properties visible through dedicated light polarization features. Additionally, in embodiments, the one or more layers may include a covert security feature comprising a luminescent layer (e.g., a W B Gravure printed invisible fluorescent ink). In further embodiments, the one or more layers may include an absorption background layer, for example, a dark (e.g., black) layer of ink (e.g., an infrared absorbing (IRA) black ink, an infrared transparent (IRT) black ink or a combination thereof). In further embodiments, the one or more layers may include a metallic gold layer of ink, which may also include one or more machine readable (MR) features.

In accordance with aspects of embodiments of the invention, the combination of the one or more ink layers, can produce synergistic effects with regard to the appearance (e.g., distinctiveness) of the security laminate structure.

In accordance with additional aspects of embodiments of the invention, each layer of the at least two ink layers may have different selective reflection bands of the light while illuminated at the predetermined wavelength.

Overt Security Feature Inks Having Interference Pigments

In embodiments, the one or more layers include an overt security feature comprising an ink composition having interference pigments. In embodiments, the ink composition having interference pigments may comprise one or more layers of optically variable pigments (OVP), which exhibit a viewing angle dependent shift of color.

OVPs have proven effective as an efficient, printable anti-copy device on bank notes and security documents since 1987. Today, a large part of the worldwide printed currency relies on optically variable copy protection devices, and among these latter, optically variable ink (OVI®) has acquired a preeminent place.

The viewing-angle dependent shift of color cannot be reproduced by color copying equipment. Various different types of OVP materials are commercially available today, all depending on interference thin film structures. The hue, the color travel and the chromaticity of the structures however depend upon on the material constituting the layers, the sequence and the number of layers and, the layer thickness, as well as on the production process.

Very brilliant colors are obtained with a first type of OVP, made by physical vapor deposition (PVD) according to e.g. U.S. Pat. Nos. 4,705,300; 4,705,356; 4,721,217; 4,779,898; 4,930,866; and 5,084,351, the entire disclosures of which are incorporated by reference herein. This OVP is constructed as a thin-film vapor-deposited Fabry-Perot resonator stack. Simple-sandwich metal-dielectric-metal, as well as double-sandwich metal-dielectric-metal-dielectric-metal layer sequences are described. The middle metal layer can be realized as opaque totally reflecting layer to yield a maximum in reflectivity of the incident light. The top metal layer(s) must be partially transparent, such that light can be coupled in and out of the Fabry-Perot resonator.

Incident light falling upon an optically variable pigment flake of said metal-dielectric-metal type is partially reflected at the top metal layer. Another portion of the light travels through the dielectric and is reflected at the bottom metal layer. Both reflected parts of the incident light finally recombine and interfere with each other. Constructive or destructive interference results, depending on the thickness of the dielectric layer and on the wavelength of the incident light. In the case of white incident light, some of the light components, having determined wavelengths, are reflected, whereas other components, having other wavelengths, are not reflected. This gives rise to a spectral selection, and hence to the appearance of color.

The path difference between the top-reflected and the bottom-reflected part of the light depends on the angle of incidence, and so does the resulting interference color.

Another, second type of OVP, made according to EP 708, 154; DE 195,25,503; U.S. Pat. Nos. 5,624,468, 5,401,306; 4,978,394; and 4,344,987, the entire disclosures of which are incorporated by reference herein, is based on coated aluminum flakes. Mechanically flattened aluminum particles are coated by chemical vapor deposition (CVD) or by wet chemical methods with a dielectric layer and a subsequent metal or second dielectric layer. Interference colors result by the same effect as described above.

In embodiments of the present invention optically variable pigments (OVP), which may be used in at least one layer in the marking of the invention, may comprise apart from the viewing angle dependent color shift, additional features resulting in a response upon exposure to external energy.

The OVP pigments comprise an interference structure of at least two thin film layers of different materials, and exhibit a viewing angle dependent shift of color. In embodiments, at least one of said layers comprises at least one luminescent material. The OVP may have a structure comprising at least one light-transmitting dielectric layer with a first and a second surface essentially parallel to each other and at least one semi-transparent, partially reflecting layer arranged on each of said first and second surfaces of the dielectric layer with the luminescent material being comprised in at least one of the dielectric layers. The OVP may also have a structure comprising an opaque totally reflecting layer having first and second surfaces essentially parallel to each other and at least one sequence arranged on at least one of said first and second surfaces of the opaque totally reflecting layer. The sequence comprises at least one dielectric layer and at least one semi-transparent partially reflecting layer with the dielectric layer of the sequence being adjacent to the totally reflecting layer and the luminescent material being comprised in at least one of the dielectric layers.

The partially reflecting and partially transmitting top layer has a thickness in the range of 5 to 25 nm. Preferably the semi-transparent partially reflecting layer is chosen from metal, metal-oxides or metal-sulfides such as aluminum, chromium, $MoS_2$, $Fe_2O_3$. The dielectric layer is of a low refractive index material having an index of refraction not exceeding 1.50, under the precondition that the material does not comprise luminescent material. Preferably the material is chosen from $MgF_2$, $SiO_2$, and $AlF_3$. Low refractive index dielectrics result in a high angle-dependent color shift. The thickness of the dielectric depends on the desired OVP color; it is of the order of 200 to 600 nm. For example, gold-to-green OVP, e.g., has an $MgF_2$ layer of 440 nm in thickness, and green-to-blue OVP includes an $MgF_2$ layer of 385 nm in thickness. The opaque totally reflecting layer is selected from metals or metal alloys such as aluminum, silver, copper, cobalt-nickel alloy, aluminum alloys. Most preferred is aluminum with a reflectivity of nearly 99% over the whole spectral domain of interest. The totally reflecting layer has a thickness in the range of 50 to 150 nm. Pigments of the latter type can have a symmetric $Cr/MgF_2/Al/MgF_2/Cr$ structure, in order to yield equal reflecting properties for both sides. The central aluminum layer acts as a total reflector. In the context of the present invention it is sufficient to consider the half of the OVP structure, i.e. the basic $Cr/MgF_2/Al$ stack. These pigments consist of flakes, which are of the order of 20 to 30 nm large, and about 1 nm of thickness.

In certain embodiments, the dielectric layer may not contain luminescent ions, and in this case are considered as a part of OVP of first order. The OVP of first order may have additional luminescent ions, wherein the luminescent ions are incorporated into a dielectric coating applied to the aluminum flakes, to yield OVP (also named OVP of a second type). Said dielectric coating can again be applied either by chemical vapor deposition, e.g., using a fluidized-bed reactor, or alternatively, by wet chemical methods, as known by those ordinarily skilled in the art. The color-shifting properties of these types of OVP are related to the realizable path difference, within the dielectric, between orthogonal incidence and grazing incidence. The incident beam is diffracted according to Snell's law, $n_1*\sin(\alpha)=n_2*\sin(\beta)$, where $n_1$ and $n_2$ are the respective refraction indices of the materials 1 and 2, and $\alpha$ and $\beta$ are the respective beam angles to the normal. Assuming $n_1=1$ (air), the grazing angle incidence ($\alpha=90°$ condition is described as $\sin(\beta)=1/n_2$. The maximum length of the light path L within the dielectric, in terms of the dielectric thickness d, is then given by $L=d/\sqrt{1-1/n_2^2}$.

The dielectric layer of the OVP flake can comprise at least one luminescent ion. Especially interesting for the purpose of the present invention are the trivalent ions of certain transition elements such as chromium ($Cr^{3+}$), iron ($Fe^{3+}$), etc. Particularly preferred are rare-earth ions. Preferably the rare earths ions are selected from the group consisting of yttrium ($Y^{3+}$), praseodymium ($Pr^{3+}$), neodymium ($Nd^{3+}$), samarium ($Sm^{3+}$), europium ($Eu^{3+}$), terbium ($Tb^{3+}$), dysprosium ($Dy^{3+}$), holmium ($Ho^{3+}$), erbium ($Er^{3+}$), thulium ($Tm^{3+}$) and ytterbium ($Yb^{3+}$).

Such doping is not easily practicable with $MgF_2$ as the dielectric, because of the relatively small ionic radius of the $Mg^{2+}$ ion (72 pm), compared to the radii of the trivalent rare-earth ions (86-102 pm), and of the simultaneous need for charge compensation. Although the co-evaporation of $MgF_2$ with trivalent rare earth fluorides yields chemically doped materials, the narrow $MgF_2$ host lattice cannot accommodate for the strain induced by the voluminous doping ions, which tend in consequence to form clusters. Clustered excited rare-earth ions undergo rapid non-radiative deactivation, and no luminescence is observed.

The dielectric layer containing the luminescent material is selected from the group consisting of difluorides of the second main group or zinc or cadmium, or of mixtures thereof. In a preferred embodiment, $CaF_2$ is used as dielectric material to be doped with trivalent rare-earths, in particular lanthanoides, due to the comparable ionic radii of $Ca^{2+}$ (100 pm) and of the $Ln^{3+}$ ions. The positive excess charge of the $Ln^{3+}$ dopant must be compensated, however. Charge compensation can be brought about either anionically, by replacing a fluoride ion ($F^-$ 133 pm) by an oxide ion ($O^{2-}$, 140 pm), or cationically, by replacing a calcium ion ($Ca^{2+}$, 100 pm) by a sodium ion ($Na^+$, 102 pm). Anionic compensation is easily achieved by annealing the material in oxygen, but may not be practicable in the presence of a heat-sensitive carrier web. Cationic compensation requires a carefully controlled, simultaneous co-doping with equal amount of $Ln^{3+}$ and $Na^+$ ions during the sputtering process.

Dielectric materials, also allowing for an easy incorporation of the luminescent material in particular the trivalent rare-earth ions (however without charge compensation), are selected from the group consisting of trifluorides of rare earths, trifluorides of bismuth, or mixtures thereof, complex fluorides of trivalent rare earth ions or bismuth and monovalent alkaline ions or divalent alkaline-earth or transition ions, in particular zinc and mixtures thereof. Particularly preferred are trifluorides of yttrium and in particular the non-luminescent ions, i.e., $YF_3$, $LaF_3$, $CeF_3$, $GdF_3$, $LuF_3$, and $BiF_3$ or, alternatively, among their complex fluorides, e.g., $ALnF_4$, $AeLn_2F_8$, $ALn_3F_{10}$, etc., wherein A is a monovalent alkaline ion, preferably selected among $Li^+$, $Na^+$, $K^+$; Ae is a divalent alkaline-earth or transition ion, preferably selected among $Mg^{2+}$, $Ca^{2+}$, $Sr^{2+}$, $Ba^{2+}$, $Zn^{2+}$, and Ln is a trivalent rare-earth ion, preferably selected amongst $Y^{3+}$, $La^{3+}$, $Ce^{3+}$, $Gd^{3+}$, or $Bi^{3+}$. In the context of the present invention, the pure trifluorides or mixtures thereof are preferable over said complex fluorides, because the evaporation characteristics of the former can be better controlled.

For the incorporation of luminescent material, in particular of the trivalent transition element ions, dielectric materials are selected from the group consisting of trifluorides of elements of the third main group or bismuth or of trivalent transition element ions or mixtures thereof, complex fluorides of elements of the third main group or bismuth and an alkaline ion, an alkaline-earth ion or zinc or mixtures thereof. Particularly adapted are $EF_3$ materials, wherein E is $Al^{3+}$, $Ga^{3+}$, $In^{3+}$, $Bi^{3+}$, or a trivalent transition element ion or $Na_3AlF_6$.

Fluoride materials are the preferred dielectric hosts for said luminescent ions. Fluorides have a low-energy optical phonon spectrum, i.e., their IR absorption bands are situated at low energy. Under such circumstances, the vibrational deactivation of the embedded excited luminescent ions is strongly inhibited, resulting in a high luminescence yield and in long-lived excited states. Fluorides are, furthermore, a rather uncommon host matrix in commercially available luminescents. This adds favorably to the security potential of the present invention. The luminescent ions incorporated in the OVP can in this way be distinguished, e.g., by their specific luminescence decay times, from simple mixtures of commercial luminescents and non-security optically variable ink.

In any case, OVP having luminescence centers incorporated within the Fabry-Perot resonance cavity can be distinguished from simple mixtures of non-luminescent OVP (and added luminescent material) by their angle-dependent excitation spectrum. That is, the OVP's resonance cavity internally amplifies the incident light intensity for wavelengths corresponding to the minima of the cavity's reflection characteristics, i.e., for $n*d=k*\lambda/2$, the laser resonator condition. At these wavelengths, the cavity preferably takes up energy from the environment, and the light intensity inside the cavity reaches a multiple of the outside intensity. Thus, a luminescent material situated within the cavity will be more strongly excited at the cavity's resonance condition than out of this condition. Because the cavity's resonance wavelength is angle-dependent, the luminescence intensities obtained for different incidence angles of the same exciting radiation will be different, which makes it possible to determine that the luminescent is located within the OVP's cavity rather than outside of it.

The deposition of the luminescent dielectric layer can be performed by the same method as used for the deposition of the $MgF_2$ layer. For example, the $MgF_2$ can be deposited from a hot semi-melt by electron beam sputtering. Rare-earth fluorides are more or less comparable in melting point and evaporation characteristics with $MgF_2$, and can therefore be deposited by the very same technique. The doping elements can be added in beforehand to the matrix fluoride; e.g., 2% of $EuF_3$ can be pre-melted with 98% of $LaF_3$ to form a homogeneous mixture, and this mixture may be used as a depositing material. To compensate for an eventual decrease in angle-dependent color-shift caused by the presence of the $LnF_3$ layer, the MgF$_2$ part of the dielectric can be replaced, according to embodiments of the invention, by an AlF$_3$ layer. AlF$_3$ has a lower index of refraction (n=1.23) than MgF$_2$ (n=1.38), and thus, can easily compensate for the introduction of an equivalent layer of LaF$_3$ (n=1.55).

In the context of the embodiments of the present invention, the at least one overt layer comprises OVP flakes, which can be OVP flakes of first or second order or mixtures thereof. It is also noted that the OVP used in the context of the present invention and which are part of the overt layer, is not limited to those cited above. For example, one skilled in the art can use other known OVP flakes in the context of the present invention.

One of the advantages of using OVP flakes is that, in embodiments, the OVP layer will provide a substantially fully reflective layer that may backlight a partially reflective layer (e.g., a semi-covert layer) that may be located above the overt layer. The corresponding perception of the flakes that comprise the semi-covert layer (e.g., with a dedicated device) will be enhanced, and could additionally serve as a basis for a fingerprint recognition. Moreover, as this effect is hard to reproduce, this bonus effect adds to the high security level of the security laminate according to the present invention.

Covert Security Feature Inks

Luminescent Layer

In embodiments, the one or more layers may include a luminescent layer. For example, the luminescent layer may include a luminescent pigment. The term "luminescence" as used herein refers to the process in which light is emitted from a material at a different wavelength than that which is absorbed. It is an umbrella term covering both fluorescence and phosphorescence. The term "fluorescence" as used herein refers to a luminescence phenomenon in which electron de-excitation occurs almost spontaneously, and in which emission from a luminescent substance ceases when the exciting source is removed. In fluorescent materials, the excited state has the same spin as the ground state. A compound capable of fluorescence is termed a "fluor". The term "phosphorescence" as used herein refers to a quasi-stable electron excitation state involving a change of spin state (intersystem crossing) which decays only slowly. In phosphorescence, light emitted by an atom or molecule persists after the exciting source is removed. It is similar to fluorescence, but the species is excited to a metastable state from which a transition to the initial state is forbidden. Emission occurs when thermal energy raises the electron to a state from which it can de-excite. Therefore, phosphorescence is temperature-dependent. The term phosphorescence thus refers to a delayed luminescence or sustained glowing after exposure to energized particles such as electrons or ultraviolet photons, that is, a luminescence that persists after removal of the exciting source. It is sometimes called afterglow. A compound capable of phosphorescence is termed a "phosphor".

Luminescent compounds in pigment form have been widely used in inks and other preparations (see U.S. Pat. No. 6,565,770, WO08033059, WO08092522, the entire disclosures of which are incorporated by reference herein). Examples of luminescent pigments can be found in certain classes of inorganic compounds, such as the sulphides, oxysulphides, phosphates, vanadates, garnets, spinels, etc. of nonluminescent cations, doped with at least one luminescent cation chosen from the transition-metal or the rare-earth ions.

Suitable luminescent compounds that could be incorporated in the luminescent layer according to the present invention can be found in US2010/0307376 which relates to rare-earth metal complexes, the entire disclosure of which is incorporated by reference herein. The rare-earth metal complexes are chosen from the luminescent lanthanide complexes of trivalent rare-earth ions with three dinegatively charged, tridentate 5- or 6-membered heteroaryl ligands. The luminescent ink may comprise a stable, water-soluble tris-complex of a trivalent rare-earth cation with an atomic number between 58 and 70, such as, for example: Pr, Nd, Sm, Eu, Gd, Tb, Dy, Ho, Er, Tm, Yb and the mixtures thereof, with a tridentate, dinegatively charged heteroaryl ligand that absorb in the ultraviolet and/or the blue region of the electromagnetic spectrum. The luminescent emission in these lanthanide complexes is due to inner f-shell transitions such as: 5D0→7F1 and 5D0→7F2 for Eu(3+).

The corresponding luminescent lanthanide complex is of the formula:

$$M_3[Ln(A)_3]$$

wherein M is chosen from the alkali cations Li+, Na+, K+, Rb+ and Cs+ and the mixtures thereof;

wherein Ln is chosen from the trivalent rare-earth cations of Ce, Pr, Nd, Sm, Eu, Gd, Tb, Dy, Ho, Er, Tm, and Yb; and wherein A is a dinegatively charged, tridentate 5- or 6-membered heteroaryl ligand, such as the dipicolinate anion, in which the complex has an exact 1:3 (Ln:A) stoichiometry and the dinegatively charged, tridentate 5- or 6-membered heteroaryl ligand A is selected from the group consisting of pyridine, imidazole, triazole, pyrazole, pyrazine bearing at least one carboxylic acid group. The 5 to 6 membered heteroaryl of the present invention bearing at least one carboxylic group can be further substituted by a group hydroxyl, amino, a C1-C6-alkoxy, such as a methoxy, ethoxy, isopropoxy, etc. group or a C1-C6-alkyl, such as a methyl, ethyl, isopropyl, etc. group.

As described in Patent Application Publication No. US2010/0307376, the entire disclosure of which has been incorporated by reference herein, a particular process for imprinting secure document with luminescent compounds, in particular luminescent rare-earth metal complexes, is inkjet printing, and more particularly thermal inkjet printing. Thermal inkjet printers use print cartridges having a series of tiny electrically heated chambers, constructed by photolithography.

To produce an image, the printer sends a pulse of electric current through heating elements disposed in the back of each chamber, causing a steam explosion in the chamber, so as to form a bubble, which propels a droplet of ink through an orifice of the chamber onto the paper in front of it. The ink's surface tension, as well as the condensation and thus contraction of the vapor bubble, pulls a further charge of ink into the chamber through a narrow channel attached to a specific aqueous inkjet composition comprising at least one specific class of rare earth metal complexes in a specific ratio.

Other suitable luminescent compounds which could be incorporated in the luminescent layer according to the present invention are described in Patent Application Publication No. US2011/0293899, the entire disclosure of which is incorporated by reference herein. As described in Patent Application Publication No. US2011/0293899, a class of compounds that is suitable for use in, e.g., printing inks for marking purposes are perylene dyes, including perylene dyes with increased solubility. The parent compound perylene displays blue fluorescence and there are many derivatives of perylene which are known and may theoretically be employed as colorants in compositions for marking such as printing inks and the like. Quaterrylene, Terrylene derivatives and/or a colored material, such as riboflavine or flavoinoids, which have also the advantages to be non-toxic, are also suitable luminescent compounds which can be used in the context of embodiments of the present invention.

The intended purpose of the printing ink composition is one of several factors which determines suitable and desirable concentration ranges for the polymer-bonded perylene dye(s) as well as the types and concentration ranges of suitable or desirable optional components of the composition. There are many different types of printing processes. Non-limiting examples thereof include inkjet printing (thermal, piezoelectric, continuous, etc.), flexography, intaglio printing (e.g., gravure printing), screen printing, letterpress printing, offset printing, pad printing, relief printing, planographic printing and rotogravure printing. In a preferred embodiment, a printing ink composition in accordance with the present invention is suitable (at least) for inkjet printing. (Industrial inkjet printers, commonly used for numbering, coding and marking applications on conditioning lines and printing presses, are particularly suitable. Preferred ink jet printers include single nozzle continuous ink-jet printers (also called raster or multi-level deflected printers) and drop-on-demand ink-jet printers, in particular valve-jet printers.)

In embodiments, the multilayer structure may include one or more luminescent layers, as described above and each layer may additionally contain one or more luminescent compounds with different chemical and/or physical properties. Above cited examples of luminescent compounds are non-limiting examples in the context of the present invention. In embodiments, the luminescent layer containing the luminescent compounds used in the context of the present invention could be a partially opaque layer or an opaque layer.

Semi-Covert Security Feature Inks

In embodiments, the one or more layers may include a semi-covert security feature comprising an optically active security ink incorporating both an overt color shift and semi-covert properties visible through dedicated light polarization features. In embodiments, the optically active security ink incorporating both an overt color shift and semi-covert properties may comprise one or more layers of at least one cholesteric liquid crystal polymer (CLCP). In embodiments, the one or more layers of CLCP comprise one or more layers of flakes of CLCP.

For example, with a CLCP layer, an unusual color shift, e.g. a color changing from green to red-violet, can be produced. Similarly, CLCP multilayers can be produced wherein the individual layers, having different reflection wavelengths, reflect light of a different sense of circular polarization. The resulting film, as well as the pigments produced there from, displays a first color to the unaided eye, and different second and third colors when viewed through left- or right-circular polarizing filters, respectively.

Additional non-limiting examples of materials for use in the present invention are flakes having at least one layer of CLCP. Such polymers reflect a circular polarized light component. Thus, within a determined wavelength range, light having a determined circular polarization state (left- or right-handed, depending on the polymer) is predominantly reflected. Cholesteric liquid crystal polymers have a molecular order in the form of helically arranged molecular stacks. This order is at the origin of a periodic spatial modulation of the material's refractive index, which in turn results in a selective transmission/reflection of determined wavelengths and polarizations of light. The particular situation of the helical molecular arrangement in CLCPs causes the reflected light to be circular polarized, left-handed or right-handed, depending on the sense of rotation of the molecular helical stack.

A marking, comprising a random distribution of CLCP flakes, provides the security laminate, for example, with a unique optical signature, detectable and distinguishable through its specific reflection of circular polarized light. The flakes can appear in random positions and orientations on the security laminate. The marking, which can be almost transparent, but distinguishable from the background through its polarization effect, can be used in all types of authentication, identification, tracking and tracing applications, for all types of documents or goods. While inks comprising CLCP flakes, for example, are discussed herein as carriers for track-and-trace purposes, embodiments of the present invention also contemplate additional types of carriers for track-and-trace information, such as, for example, visible and infrared carriers. Embodiments of the invention contemplate visible and/or infrared track-and-trace carriers in addition to, or in place of the CLCP carriers.

Such CLCP flakes are obtainable from a corresponding CLCP multilayer film by breaking the film into the corresponding flakes by techniques known by those skilled in the art. The chiral liquid crystal polymer layer can be formed from a chiral liquid crystal precursor composition comprising (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

The chiral liquid crystal precursor composition preferably comprises a mixture of: (i) one or more nematic (precursor) compounds A; and (ii) one or more cholesteric (i.e., chiral dopant) compounds B (including cholesterol), which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention, for example, will be about five to about twenty times the (total) concentration of the one or more cholesteric compounds B.

Nematic (precursor) compounds A which are suitable for use in the chiral liquid crystal precursor composition are known in the art; when used alone (i.e., without cholesteric compounds) they arrange themselves in a state characterized by its birefringence. Non-limiting examples of nematic compounds A that are suitable for use in the present invention are described in, e.g., WO 93/22397, WO 95/22586, EP-B-0 847 432, U.S. Pat. No. 6,589,445, US 2007/0224341 A1. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups that are capable of taking part in a free radical polymerization, and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated below as examples for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

The one or more cholesteric (i.e., chiral dopant) compounds B for use in the present invention preferably comprise at least one polymerizable group. Suitable examples of the one or more chiral dopant compounds B include those of formula (I):

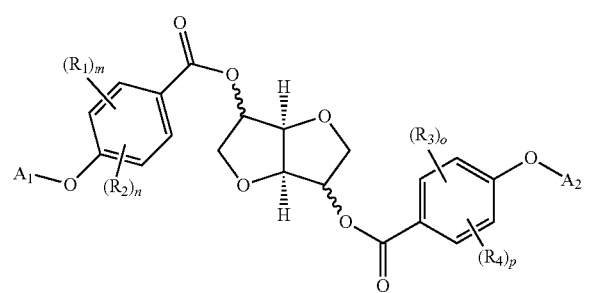

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

  (i)

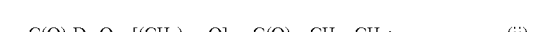  (ii)

  (iii)

$D_1$ denotes a group of formula

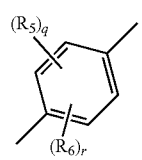

$D_2$ denotes a group of formula

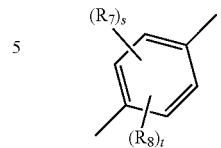

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment, the one or more chiral dopant compounds B may comprise one or more isomannide derivatives of formula (IA):

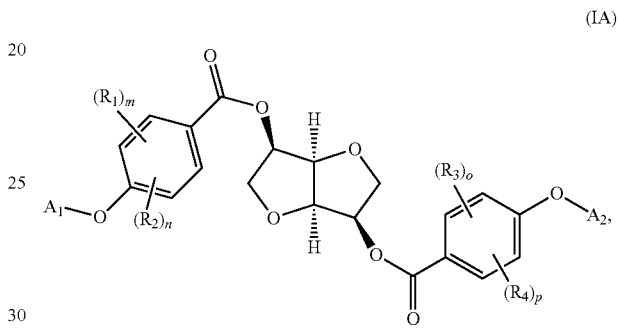

(IA)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

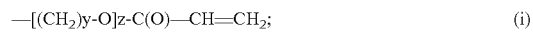  (i)

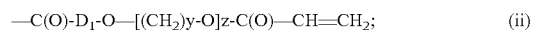  (ii)

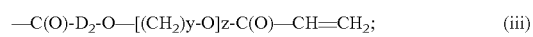  (iii)

$D_1$ denotes a group of formula

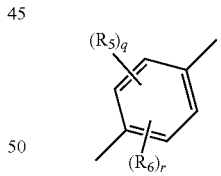

$D_2$ denotes a group of formula

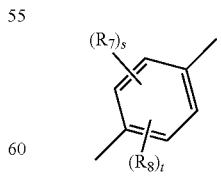

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one exemplary embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another exemplary embodiment of the compounds of formula (I) and of formula (IA), $A_1$ and $A_2$ each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-$D_1$-O—[(CH$_2$)$_y$—O]$_z$—C(O)—CH═CH$_2$ and/or of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-$D_1$-O—[(CH$_2$)$_y$—O]$_z$—C(O)—CH═CH$_2$ and/or a group of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkoxy.

In another embodiment, the one or more chiral dopant compounds B may comprise one or more isosorbide derivatives represented by formula (IB):

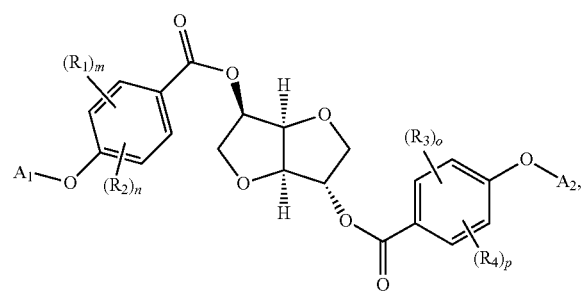

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)y-O]z-C(O)—CH═CH$_2$; (i)

—C(O)-$D_1$-O—[(CH$_2$)y-O]z-C(O)—CH═CH$_2$; (ii)

—C(O)-$D_2$-O—[(CH$_2$)y-O]z-C(O)—CH═CH$_2$; (iii)

$D_1$ denotes a group of formula

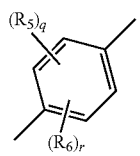

$D_2$ denotes a group of formula

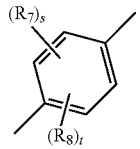

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH═CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-$D_1$-O—[(CH$_2$)$_y$—O]$_z$—C(O)—CH═CH$_2$ and/or of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-$D_1$-O—[(CH$_2$)$_y$—O]$_z$—C(O)—CH═CH$_2$ and/or a group of formula —C(O)-$D_2$-O—[(CH$_2$)$_y$—O]$_z$—C(O)—CH═CH$_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from about 30% to about 50% by weight, based on the total weight of the polymer composition.

A chiral liquid crystal precursor composition use to obtain a chiral liquid crystal polymer layer will usually comprise a solvent to adjust its viscosity to a value which is suitable for the employed application method. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene, and mixtures of two or more thereof.

If a chiral liquid crystal precursor composition (comprising one more polymerizable monomers) is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl(2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a chiral liquid crystal precursor composition is to be cured by a method which is different from irradiation with UV light such as, e.g., by high-energy particles (e.g., electron beams), X-rays, gamma-rays, etc. the use of a photoinitiator can, of course, be dispensed with.

The at least two chiral liquid crystal polymer (CLCP) layers can comprise components A) and B), wherein A) is 20-99.5 wt % of at least one three-dimensionally crosslinkable compound of the formula (1)

$$Y^1\text{-}A^1\text{-}M^1\text{-}A^2\text{-}Y^2 \qquad (1)$$

wherein $Y^1, Y^2$ are equal or different, and represent polymerizable groups;

$A^1, A^2$ are equal or different residues of the general formula $C_nH_{2n}$, wherein n is an integer between 0 and 20, and wherein at least one methylene group may be replaced by an oxygen atom;

$M^1$ has the formula —$R^1$—$X^1$—$R^2$—$X^2$—$R^3$—$X^3$—$R^4$—; wherein $R^1$ to $R^4$ are equal or different bivalent residues chosen from the group consisting of —O—, —COO—, —COHN—, —CO—, —S—, —C≡C—, CH—CH—, —N═N—, —N═N(O)—, and a C—C bond; and wherein $R^2$—$X^2$—$R^3$ or $R^2$—$X^2$ or $R^2$—$X^2$—$R^3$—$X^3$ may as well be a C—C bond;

$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$; wherein $B^1$ to $B^3$ are equal or different substituents chosen from the group consisting of hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —NO$_2$, Formyl, Acetyl, and alkyl-, alkoxy-, or alkylthio-residues with 1 to 20 carbon atoms having a chain interrupted by ether oxygen, thioether, sulfur or ester groups; and B) is 0.5 to 80 wt % of at least one chiral compound of the formula (2)

$$V^1\text{-}A^1\text{-}W^1\text{—}Z\text{—}W^2\text{-}A^2\text{-}V^2 \qquad (2)$$

wherein $V^1, V^2$ are equal or different and represent a residue of the following: acrylate, methacrylate, epoxy, vinyl ether, vinyl, isocyanate, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, Formyl, Acetyl, as well as alkyl-, alkoxy-, or alkylthio-residues with 1 to 20 carbon atoms having a chain interrupted by ether oxygen, thioether sulfur or ester groups, or a cholesterol residue;

$A^1, A^2$ are as indicated above;

$W^1, W^2$ have the general formula —$R^1$—$X^1$—$R^2$—$X^2$—$R^3$—, wherein $R^1$ to $R^3$ are as indicated above, and wherein $R^2$ or $R^2$—$X^2$ or $X^1$—$R^2$—$X^2$—$R^3$ may also be a C—C bond;

$X^1, X^2$ are as indicated above;

Z is a divalent chiral residue chosen from the group consisting of dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

The component B) can be selected from at least one of AnABIs-(2-[4-(acryloyloxy)-benzoyl]-5-(4-methoxybenzoyl)-isosorbid), DiABIs (di-2,5-[4-(acryloyloxy)-benzoyl]-isosorbid), and DiABIm (di-2,5[(4'-acryloyloxy)-benzoyl]-isomannid).

A flake may be made, for example, by first preparing a CLCP multilayer film with properties as discussed above, and thereafter comminuting (e.g., chopping, crushing, etc.) the film to thereby form multilayer flakes, as disclosed, for example, in US 2010/0178508 A1 or US 2010/0200649 A1, which are incorporated by reference in their entireties herein. For example, the polymerized CLCP film is detached from a carrier and the cover foil through a peeling, scratching, brushing or other operation. The resulting, coarse CLCP flakes are worked up into pigment using known comminuting operations, such as milling with hammer-, impact-, ball-, or jet-mills, and classified by known separation methods such as triage and sieving, in order to obtain a pigment with specified particle size, having a d50-value in an application-specified range between 5 and 5000 micrometer. The average diameter can be between 3 to 30 times the total layer thickness of the flake In addition to a determined reflection color, the cholesteric liquid crystal polymer (CLCP) shows also a more or less pronounced viewing-angle dependent color variation ("color shift.") Films and pigments made of CLCP are for this reason suitable as security elements on value and identity documents, because the color-shifting effect cannot be reproduced by photocopying machines.

A number of different reflection colors can be realized with a same given CLCP precursor material through appropriately choosing the manufacturing conditions. Further to this, the handiness (left- or right-handed) of the reflection can be chosen as well through the appropriate choice of the chirality inducing additive at the time of manufacturing the material.

In embodiments, the CLCP layer exhibits high brilliance and viewing-angle dependent color change (color-flip effect), as well as particular reflection properties, such as, for example, a color change from a short-wavelength to a long-wavelength color in going from orthogonal to oblique view, or an extremely long travel in color space in response to a changing viewing angle.

With embodiments of the present invention, the optical properties of the CLCP layer can be tuned very precisely. The process and the materials allow for a more accurate production of a determined CLCP's spectral reflection profile, because the profile can be precisely composed by superposing an appropriate numbers of layers, each layer having its characteristic narrow band reflection profile at a pre-set wavelength. This allows coding a pigment with an invisible, narrow-band spectral feature, which, for example, does not show up as a visible appearance, but which can be evidenced with the help of a spectrometer or a particular optical filter device.

The fact that the reflected light of a CLCP is circularly polarized can be used as a further security element. The sense of this circular polarization is determined through the manufacturing process. The circular polarization handiness can be chosen individually for each layer of the multilayer CLCP, and this polarization handiness can be evidenced with the help of a corresponding polarization filter. It is thus possible to give any layer of the multilayer CLCP an individual narrow-band reflection color, and individual polarization handiness.

For example, with the CLCP pigment, an unusual color shift, e.g. a color changing from green to red-violet, can be produced. Similarly, CLCP multilayers can be produced wherein the individual layers, having different reflection wavelengths, reflect light of a different sense of circular polarization. The resulting film, as well as the pigments produced there from, displays a first color to the unaided eye, and different second and third colors when viewed through left- or right-circular polarizing filters, respectively. For example, in a particular embodiment of a security element, a first layer of the CLCP multilayer reflects a first color, e.g. green, of left-circular polarized light, and a second layer of the CLCP multilayer reflects a second color, e.g. red, of right-circular polarized light. There will be a first visible color displayed by the security element to the unaided eye, which is composed of both reflections, e.g. green and red; the resulting appearance is yellow. Viewed under a left-circular polarizing filter, however, the same security element will appear green, and viewed under a right-circular polarizing filter, it will correspondingly appear red.

The differing optical property is preferably a wavelength of maximal reflection and/or a circular polarization state. It may, however, also comprise optical absorption or luminescence properties, such as can be obtained through the admixture of dyes, pigments or luminescent compounds to one of the CLCP layers of the multilayer, or an adjacent luminescent layer, as discussed below. The CLCP flakes can further comprise an additional layer made with luminescent and/or magnetic material.

Embodiments of the present invention may utilize CLCP flakes having an exemplary three-layer configuration as follows: $L_1/L_2/L_3$, wherein $L_1$ and $L_3$ are each chiral liquid crystal polymer layers having respective reflectances of $\lambda_1$ max and $\lambda_2$ max, (which could be the same or different), and wherein $L_2$ is a layer made with luminescent and/or magnetic materials with specific optical or magnetic properties. Such flakes provide a high level of coding properties. For example, different sizes of flakes may be used, with different luminescent properties, and/or with different circular polarization properties for layers $L_1$ and $L_3$. This high level of coding properties reinforces the protection of the security laminate in the context of the present invention and drastically limits the possibility of a counterfeiter to reproduce the security laminate with such a high level of protection.

The number of realizable different optical responses can be substantially increased if different CLCP pigment types, having different optical responses, are combined with each other in a same ink. The production of a security element in such case depends on the availability of two or more different pigments, which are mixed together in the appropriate ratios for serving a determined security document application.

The security level of the CLCP material could be further increased, if the different optical responses could be combined into a same physical pigment, because it is much easier to make up an ink comprising a mixture of a few modular pigments having basic optical responses (i.e. to combine letters of an alphabet), than to manufacture a single pigment which combines optical basic responses into a more complex response (i.e. to find a determined word). Whereas the former can essentially be done in any printer's shop, if the basic pigments are available, the latter can only be performed at the pigment manufacturing facility, and enables therefore a control of the pigment supply chain.

With additional contemplated embodiments, the flakes, when incorporated in a coating material, such as a resin or ink, can be deposited on a substrate in a random distribution by a suitable technique, such as a printing technique, such as inkjet printing or spraying techniques. This makes possible the creation of a unique code which can be based on, e.g., the random distribution of the flakes and/or different sizes of flakes and/or a unique distribution of a color shift effect and/or based on the properties of the one or more detectable elements that may be present in the flakes, including any one of the layers of the flake, such as one or more of the chiral liquid crystal polymer layers.

The method can include marking a security laminate, wherein the method comprises providing the substrate with a marking comprising a plurality of coding flakes; reading deterministic data and/or non-deterministic data, such as non-deterministic data representative of at least distribution of the plurality of coding flakes in the marking; and recording and storing in a computer database the deterministic and/or non-deterministic data, such as non-deterministic data representative of at least distribution of the plurality of coding flakes in the marking.

The method can also include identifying and/or authenticating a substrate, article of value or item, wherein the method comprises reading deterministic data and/or non-deterministic data of a marking associated with the substrate including a plurality of coding flakes; and comparing using a database through a computer the read data with stored data of the deterministic and/or non-deterministic data, such as non-deterministic data representative of at least distribution of the plurality of coding flakes in the marking.

The non-deterministic data can comprise the distribution of flakes or the plurality of flakes within the marking. Moreover, the non-deterministic property can be random sizes of flakes in one or more markings. A marking in the security laminate, comprising a random distribution of circular polarizing particles, (such as can be applied to an item attaching the security laminate to the item), provides the item with a unique optical signature, detectable and distinguishable through detectable parameters.

As disclosed in US 2010/200649 A1, the entire disclosure of which is incorporated by reference herein in its entirety, the method of marking and identifying or authenticating an item can comprise the steps of a) providing an item with a random distribution of particles, (the particles being chosen from any embodiments of the flakes as disclosed herein); b) recording and storing, at a first point in time, data representative of the random distribution of flakes, using a reading device comprising illumination elements and optical detectors; c) identifying or authenticating the marked item at a later point in time using a reading device as in step b) and the stored data representative of the random distribution of particles. In embodiments, the reading devices of step b) and c), while they can be the same device, need not to be the same device, nor of the same type of device. In accordance with aspects of embodiments of the present invention, the method can use CLCP flakes that reflect a circular polarized light component, preferably in at least one spectral area chosen from the ultraviolet, the visible, and the infrared electromagnetic spectrum, i.e., between approximately 300 nm and 2500 nm wavelength.

The term "reading device" designates a device which is capable of identifying or authenticating a document or item marked with the flake and/or film as disclosed herein. In addition to this, the reading device may have other capabilities, such as that of reading barcodes, taking images, etc. The reading device may in particular be a modified barcode reader, camera mobile phone, an electronic tablet or pad, an optical scanner, etc. The reading can be performed with a reading device comprising at least illumination elements and optical detection elements, and can include magnetic properties detection elements depending upon parameters to be determined. The device can contain all the elements able to capture all the information and/or there can be multiple devices able to capture only or more properties from one to another, and all collected information will be after a post treatment linked together to generated the code.

In accordance with aspects of the invention, one or more layers printed on the security laminate may include a layer of partially reflective flakes, e.g., CLCP flakes (e.g., a CLCP pigment layer). The optical security markings have the advantage to show, in addition to the visible color shifting effect with changing viewing angle, an invisible circular polarization effect, which can be evidenced with the help of a corresponding instrument.

The pigments of the present invention are preferably used in printing inks for the silk-screen, flexo, offset, and gravure printing processes; however, offset, copperplate intaglio and tampographic printing processes are considered as well.

In embodiments, the multilayer structure may include one or more optically active security inks incorporating both an overt color shift and semi-covert properties visible through dedicated light polarization features, as described above.

System Environment

Any combination of one or more computer usable or computer readable medium(s) may be utilized with embodiments of the present invention, for example, to read, identify, authenticate, and/or control printing a security laminate. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet,
a magnetic storage device,
a usb key,
a certificate,
a perforated card, and/or
a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 9:
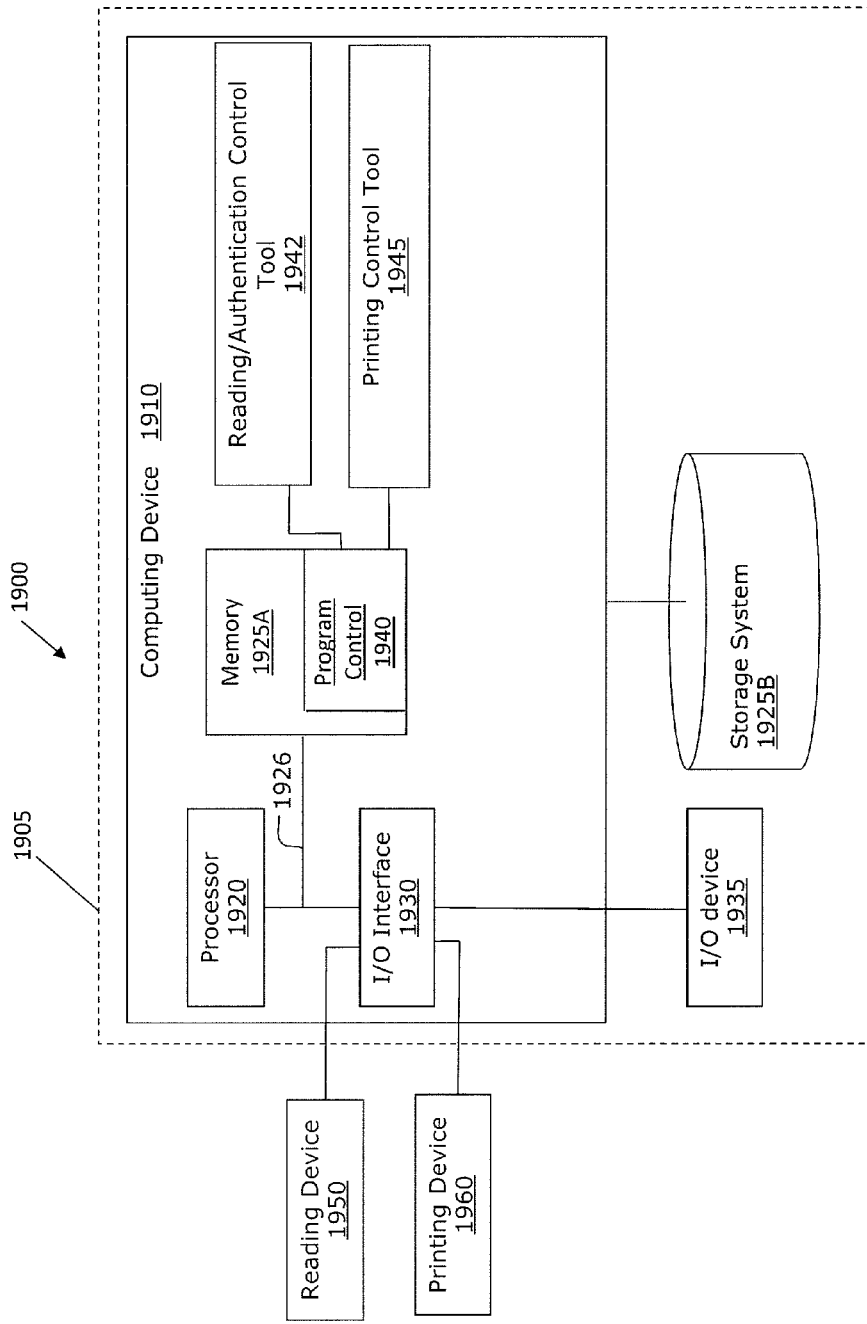
FIG. 9 shows an illustrative environment for managing some of the processes (e.g., authentication of the security laminate) in accordance with embodiments of the invention.

FIG. 9 shows an illustrative environment 1900 for managing some of the processes (e.g., authentication, reading, and/or printing) in accordance with embodiments of the invention. To this extent, the environment 1900 includes a server or other computing system 1905 that can perform the processes described herein. In particular, the server 1905 includes a computing device 1910. The computing device 1910 can be resident on a network infrastructure or computing device of a third party service provider (any of which is generally represented in FIG. 9).

In embodiments, the computing device 1910 includes the one or more reading/authentication control tool 1942, and the printing control tool 1945, e.g., the processes described herein. The one or more reading/authentication control tool 1942, and the printing control tool 1945 can be implemented as one or more program code in the program control 1940 stored in memory 1925A as separate or combined modules.

The computing device 1910 also includes a processor 1920, memory 1925A, an I/O interface 1930, and a bus 1926. The memory 1925A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 1910 is in communication with the external I/O device/resource 1935 and the storage system 1925B. For example, the I/O device 1935 can comprise any device that enables an individual to interact with the computing device 1910 or any device that enables the computing device 1910 to communicate with one or more other computing devices using any type of communications link. The external I/O device/resource 1935 may be for example, a handheld device, PDA, handset, keyboard, smartphone, etc. In embodiments, the illustrative environment 1900 may additionally include one or more reading devices 1950 for reading and/or authenticating the security laminate (or respective layers of the security laminate). In further embodiments, the illustrative environment 1900 may additionally include one or more printing devices 1960 for printing the security laminate (or respective layers of the security laminate).

In general, the processor 1920 executes computer program code (e.g., program control 1940), which can be stored in the memory 1925A and/or storage system 1925B. Moreover, in accordance with aspects of the invention, the program control 1940 having program code controls the one or more reading/authentication control tool 1942, and the printing control tool 1945. While executing the computer program code, the processor 1920 can read and/or write data to/from memory 1925A, storage system 1925B, and/or I/O interface 1930. The program code executes the processes of the invention. The bus 1926 provides a communications link between each of the components in the computing device 1910.

The computing device 1910 can comprise any general purpose computing article of manufacture capable of executing computer program code installed thereon (e.g., a personal computer, server, etc.). However, it is understood that the computing device 1910 is only representative of various possible equivalent computing devices that may perform the processes described herein. To this extent, in embodiments, the functionality provided by the computing device 1910 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 1905 is only illustrative of various types of computer infrastructures for implementing the invention. For example, in embodiments, the server 1905 comprises two or more computing devices (e.g., a server cluster) that communicate over any type of communications link, such as a network, a shared memory, or the like, to perform the process described herein. Further, while performing the processes described herein, one or more computing devices on the server 1905 can communicate with one or more other computing devices external to the server 1905 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

While the invention has been described with reference to specific embodiments, those skilled in the art will understand that various changes may be made and equivalents may be substituted for elements thereof without departing from the true spirit and scope of the invention. In addition, modifications may be made without departing from the essential teachings of the invention.

What is claimed is:

1. A laminate having a multilayer structure, the multilayer structure comprising:
   a clear film layer;
   a transfer tape adhesive layer;
   a microprint layer;
   at least one layer with repeating patterns having colorshift properties; and
   a fluorescent layer with repeating second patterns,
   wherein the microprint layer, the at least one layer with repeating patterns having colorshift properties, and the fluorescent layer with repeating second patterns are arranged between the clear film layer and the transfer tape adhesive layer, and
   wherein a plurality of individual patterns of the repeating patterns form a detectable code.

2. The laminate according to claim 1, further comprising a layer with one of a pearlescent pigment and a black layer made with one of IRA and IRT black ink.

3. The laminate according to claim 1, further comprising on the clear film layer at least one of an alphanumeric code, a 1D barcode and a 2D barcode.

4. The laminate according to claim 3, wherein the alphanumeric characters and/or a 1D or 2D barcode contain information based on at least one of a nature, a structure and a composition of each layer between the clear film layer and the transfer tape adhesive layer.

5. The laminate according to claim 3, wherein the alphanumeric characters and/or the 1D or 2D barcode contain information based on at least one of a nature, a structure and a composition at least one layer between the clear film layer and the transfer tape adhesive layer.

6. The laminate according to claim 1, wherein at least one layer with repeating patterns having colorshift properties comprises at least one of interference pigments and LCP flakes.

7. The laminate according to claim 6, wherein when said laminate comprises at least two layers with repeating patterns having colorshift properties, and wherein each layer of the at least two layers with repeating patterns having colorshift properties comprises a different material providing respective colorshift properties.

8. The laminate according to claim 6, wherein a height of the microprint text is a multiple of a $\lambda$max (maximum reflection band) of the pigments and/or flakes in the at least one layer with repeating patterns having colorshift properties.

9. The laminate according to claim 6, wherein the at least one layer with repeating pattern having colorshift properties comprises both interference pigments and LCP flakes.

10. The laminate according to claim 6, wherein a $\lambda$max (maximum reflection band) of the pigments and/or flakes in the at least one layer with repeating patterns having colorshift properties is a predetermined fraction of a height of the microprint text.

11. The laminate according to claim 1, wherein the at least one repeating pattern having colorshift properties is in the form of at least one of a logo, a drawing, one or more circles, one or more polygons, ellipses, symbols, check marks, crescents, stars, and other designs elements and shapes, comprising one or more lines.

12. The laminate according to claim 11, wherein a width of the one or more lines is between approximately 0.3 mm and 0.5 mm.

13. The laminate according to claim 11, wherein:
a width of the one or more lines is between approximately 0.1 mm and 1.0 mm,
a microprint height is between approximately 0.1 mm and approximately 1.5 mm, and
the width of lines is a multiple of the height of the microprint.

14. The laminate according to claim 11, wherein:
a width of the one or more lines is between approximately 0.3 mm and 0.5 mm,
a microprint height is between approximately 0.5 mm and approximately 0.9 mm, and
the width of lines is a multiple of the height of the microprint.

15. The laminate according to claim 11, wherein the width of lines is a multiple of the height of the microprint and the multiple is between 0.5 to 10.

16. The laminate according to claim 1, wherein a microprint height is between approximately 0.5 mm and approximately 0.9 mm.

17. The laminate according to claim 1, wherein an individual pattern of the repeating patterns comprises one of interference pigments and LCP flakes.

18. The laminate according to claim 1, wherein the plurality of individual patterns comprises a sequence of respectively adjacent patterns.

19. The laminate according to claim 1, wherein the detectable code utilizes a first ink and a second ink to represent respective values of a binary system.

20. The laminate according to claim 1, wherein the repeating patterns having colorshift properties comprise detectable differences between individual patterns.

21. The laminate according to claim 20, wherein the detectable differences between respective patterns comprise at least one of:
differences in at least one size of respective elements of the respective patterns, and
differences in at least one spacing of respective elements of the respective patterns.

22. An item bearing the laminate according to claim 1.

23. A method of using the laminate according to claim 1 for at least one of authentication and track and trace of an item bearing the laminate or associated with the laminate.

24. A method of forming a laminate, comprising a clear film layer, a transfer tape adhesive layer, a microprint text layer, at least one layer with repeating patterns having colorshift properties, and a fluorescent layer with repeating patterns, a plurality of individual patterns of the repeating patterns forming a detectable code, the method comprising:
arranging the microprint layer, the at least one layer with repeating patterns having colorshift properties, and the fluorescent layer with repeating patterns between the clear film layer and the transfer tape adhesive layer.

25. The method of claim 24, wherein the arranging comprises:
printing the fluorescent layer with repeating patterns on the clear film layer;
printing the microprint layer on the fluorescent layer;
printing the at least one layer with repeating patterns having colorshift properties on the microprint layer;
printing a background layer on the at least one layer with repeating patterns having colorshift properties; and
arranging the transfer tape adhesive layer on the background layer.

* * * * *